US009342205B2

(12) United States Patent
Chen et al.

(10) Patent No.: US 9,342,205 B2
(45) Date of Patent: May 17, 2016

(54) DISPLAY METHOD, TERMINAL DEVICE AND MULTI-TERMINAL DEVICE SYSTEM

(75) Inventors: Dong Chen, Beijing (CN); Qiang Zhang, Beijing (CN); Yingfeng Ma, Beijing (CN); Zhifeng Xin, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 57 days.

(21) Appl. No.: 14/342,669

(22) PCT Filed: Sep. 4, 2012

(86) PCT No.: PCT/CN2012/080977
§ 371 (c)(1),
(2), (4) Date: Mar. 4, 2014

(87) PCT Pub. No.: WO2013/034070
PCT Pub. Date: Mar. 14, 2013

(65) Prior Publication Data
US 2014/0218266 A1    Aug. 7, 2014

(30) Foreign Application Priority Data

Sep. 5, 2011   (CN) .......................... 2011 1 0260740
Feb. 14, 2012  (CN) .......................... 2012 1 0033264
Feb. 17, 2012  (CN) .......................... 2012 1 0037267
Feb. 20, 2012  (CN) .......................... 2012 1 0039914

(51) Int. Cl.
*G06F 3/048*     (2013.01)
*G06F 3/14*      (2006.01)

(52) U.S. Cl.
CPC .............. *G06F 3/048* (2013.01); *G06F 3/1446* (2013.01); *G06F 3/1454* (2013.01); *G09G 2354/00* (2013.01); *G09G 2356/00* (2013.01)

(58) Field of Classification Search
CPC ..... G06F 3/048; G06F 3/1446; G06F 3/1454; G06F 13/382; G06F 13/385; G06F 13/387; G09G 2354/00; G09G 2356/00; H04N 21/47; H04N 21/472; H04N 21/475; H04N 21/42207; H04W 88/04; H04W 88/06; H04W 92/18; H04M 1/02
USPC .......................................... 345/1.1, 1.2, 173
See application file for complete search history.

(56) References Cited

U.S. PATENT DOCUMENTS 9,041,735 B2 * 5/2015 Choi et al. .................... 345/629
2003/0025678 A1  2/2003 Lee et al.
(Continued)

FOREIGN PATENT DOCUMENTS

CN      102103389 A    6/2001
CN        1402116 A    3/2003
(Continued)

OTHER PUBLICATIONS

PCT/CN2012/080977 International Preliminary Report on Patentability dated Mar. 12, 2014 (9 pages).
(Continued)

*Primary Examiner* — Tom Sheng
(74) *Attorney, Agent, or Firm* — Brinks Gilson & Lione; G. Peter Nichols

(57) ABSTRACT

Disclosed are a display method, a terminal device and a multi-terminal device system. The display method is applied to a first terminal device and the first terminal device includes a first display unit. The method includes the first display unit displaying a first display interface; detecting a connection with a second terminal device, and obtaining a detection result, the second terminal device including a second display unit displaying a second display interface, and when the detection result indicating that the first terminal device and the second terminal device are connected, one of the first display unit and the second display unit displaying the first display interface, and the other of the first display unit and the second display unit displaying a third display interface, the third display interface and the first display interface being different.

17 Claims, 13 Drawing Sheets

(56) References Cited

U.S. PATENT DOCUMENTS

| | | | |
|---|---|---|---|
| 2003/0200043 | A1 | 10/2003 | Wen et al. |
| 2009/0189829 | A1 | 7/2009 | Hiramatsu et al. |
| 2010/0259464 | A1 | 10/2010 | Chang |
| 2011/0252317 | A1* | 10/2011 | Keranen ............... G06F 3/04883 715/702 |
| 2011/0276634 | A1* | 11/2011 | Maruyama et al. ........... 709/205 |
| 2012/0240060 | A1* | 9/2012 | Pennington et al. .......... 715/753 |
| 2015/0067803 | A1* | 3/2015 | Alduaiji ........................... 726/7 |

FOREIGN PATENT DOCUMENTS

| | | |
|---|---|---|
| CN | 1662914 A | 8/2005 |
| CN | 1894738 A | 1/2007 |
| CN | 1910548 A | 2/2007 |
| CN | 101119411 | 2/2008 |
| CN | 101207412 | 6/2008 |
| CN | 101459724 | 6/2009 |
| CN | 102316609 A | 1/2012 |
| WO | WO 2005/071530 A1 | 8/2005 |
| WO | WO 2010/001371 | 1/2010 |

OTHER PUBLICATIONS

PCT/CN2012/080977 International Search Report dated Nov. 22, 2012.

First Office Action dated Aug. 22, 2014 from corresponding Chinese Application No. CN 201210037267.9 (24 pages including English translation).

First Office Action dated Dec. 3, 2014 from corresponding Chinese Application No. CN 201110260740.5 (19 pages including English translation).

Second Office Action dated Apr. 21, 2015 from corresponding Chinese Application No. CN 201210037267.9 (19 pages including English translation).

Second Office Action dated Jul. 9, 2015 from corresponding Chinese Application No. CN 201110260740.5 (18 pages including English translation).

First Office Action dated May 5, 2015 out of corresponding Chinese priority Application No. 201210039914.X (15 pages).

\* cited by examiner (a)

(b)

(c)

DISPLAY METHOD, TERMINAL DEVICE AND MULTI-TERMINAL DEVICE SYSTEM

This application claims priority to International Application No. PCT/CN2012/080977 filed Sep. 4, 2012; Chinese Patent Appln. 201110260740.5 filed Sep. 5, 2011; Chinese Patent Appln. 201210033264.8 filed Feb. 14, 2012; Chinese Patent Appln. 201210037267.9 filed Feb. 17, 2012; and Chinese Patent Appln. 201210039914.X filed Feb. 20, 2012; the entire contents of each are incorporated herein by reference.

BACKGROUND

The present disclosure relates to the field of displaying of terminal devices, and in particular, to a display method, a terminal device using the display method, and a system with multiple terminal devices including multiple terminal devices.

In recent years, terminal devices such as pad computers have been becoming more and more popular. The pad computer has advantages of lightness and employing simple touch operations, and it can easily realize functions such as network surfing, playing games, watching videos, reading magazines, etc. However, the pad computer would bring inconvenience to the user when receiving complicated command or character input since it does not have the input devices used in the traditional computers, such as mouse, keyboard, etc. Recently, approaches of attaching a base, a support or other peripheral devices have been provided to overcome the above drawback. However, the peripheral devices usually cannot be used independently when detached from the pad computer, resulting in the waste of hardware device resources. In addition, there is no effective method for interactive operation among multiple pad computers.

Therefore, it is desired to provide a display method capable of effectively integrating multiple terminal devices, a terminal device using such a method, and a system with multiple terminal devices including multiple terminal devices, such that when two terminal devices (such as pad computers) are integrated, one of the two terminal devices performs local display of the operating system, and the other of the two terminal devices performs extended display such as extended input control interface, so as to form a complete PC (personal computer); one the other hand, when the two terminal devices are detached, the two terminal devices can perform respective local display respectively as independent devices.

In addition, in a prior art, there exists a network data interacting technology in which the purpose of data interaction between different processors can be realized by certain configuration operations. In this technology, any processor involved in the data interaction can perform processing and storing for the data; however, the related data processing and data storing are both performed by a separate server, in other words, any operation performed by any processor involved in the data interaction is transferred to the separate server in a signal form, and then the separate server performs corresponding processing and storing operations according to the signal. In the process, each processor involved in the data interaction needs to exchange data with the separate server respectively to realize data update.

As known from the above, in the network data interacting technology in the prior art, a separate server is needed to perform related data processing and storing in addition to the processors involved in the data interaction, and the processors involved in the data interaction need to exchange data with the separate server respectively; therefore, there exist new problems of large resource cost and complicated data update.

SUMMARY

According to one embodiment of the present disclosure, there is provided a display method applied to a first terminal device comprising a first display unit, the method comprising: displaying a first display interface by the first display unit; detecting a connection to a second terminal device and obtaining a detection result, wherein the second terminal device comprising a second display unit displaying a second display interface; when the detection result indicates the first terminal device is connected to the second terminal devices, one of the first display unit and the second display unit displaying the first display interface, while the other of the first display unit and the second display unit displaying a third display interface, wherein the third display interface is different from the first display interface.

According to another embodiment of the present disclosure, there is provided a terminal device, comprising: a first display unit configured to display a first display interface; and a detection unit configured to detect a connection of the terminal device to another terminal device and obtain a detection result, wherein the another terminal device comprising a second display unit displaying a second display interface, wherein when the detection result indicates the terminal device is connected to the another terminal devices, one of the first display unit and the second display unit displays the first display interface, while the other of the first display unit and the second display unit displays a third display interface, and wherein the third display interface is different from the first display interface.

According to yet another embodiment of the present disclosure, a system with multiple terminal devices is provided, which at least comprises: a first terminal device comprising a first display unit displaying a first display interface; and a second terminal device comprising a second display unit displaying a second display interface; wherein the first terminal device detects a connection to the second terminal device and obtains a detection result, when the detection result indicates the first terminal device is connected to the second terminal devices, one of the first display unit and the second display unit displaying the first display interface, while the other of the first display unit and the second display unit displaying a third display interface, wherein the third display interface is different from the first display interface.

The display method, the terminal device and the system with multiple terminal devices according to embodiments of the present disclosure realize effective integration of multiple terminal devices, provide more convenient operation manners of the terminal device for the users, and avoid unnecessary waste of hardware device resources.

According to another embodiment of the present disclosure, an information interaction method applied to multiple electronic devices is provided, wherein information interaction can be performed among the multiple electronic devices, and the multiple electronic devices can be used cooperatively, wherein the multiple electronic devices at least comprise a first electronic device and a second electronic device; the method comprises: when the first electronic device and the second electronic device are used cooperatively, obtaining information about information interaction state of the first electronic device and the second electronic device; and presenting the information interaction state of the first electronic device through at least one of image, text and sound according to the information about the information interaction state.

According to another embodiment of the present disclosure, an information interaction system comprising multiple electronic devices is provided, wherein information interaction can be performed among the multiple electronic devices, and the multiple electronic devices can be used cooperatively, wherein the multiple electronic devices at least comprise a first electronic device and a second electronic device; the information interaction system comprises: an interaction state information obtaining unit configured to obtain information about information interaction state of the first electronic device and the second electronic device when the first electronic device and the second electronic device are used cooperatively; and an information interaction state presenting unit configured to present the information interaction state of the first electronic device through at least one of image, text and sound according to the information about the information interaction state.

The information interaction method and system according to embodiments of the present disclosure can present the information interaction state among the multiple electronic devices used cooperatively and improve the user's experience by obtaining information about information interaction state of the first electronic device and the second electronic device when the first electronic device and the second electronic device are used cooperatively, and presenting the information interaction state of the first electronic device through at least one of image, text and sound according to the information about the information interaction state.

According to another embodiment of the present disclosure, an electronic device association method is provided, which comprises: detecting whether there is an electronic device corresponding to a preset electronic device; if it is, determining a relative spatial position relationship between the electronic device and the electronic device corresponding to the electronic device; associating the electronic device with the detected electronic device corresponding to the electronic device according to the relative spatial position relationship.

According to another embodiment of the present disclosure, an electronic device is provided, which comprises: a detection module configured to detect whether there is an electronic device corresponding to a preset electronic device; a position relationship determination module configured to determine a relative spatial position relationship between the electronic device and the electronic device corresponding to the electronic device if there is an electronic device corresponding to the electronic device; and an association module configured to associate the electronic device with the detected electronic device corresponding to the electronic device according to the relative spatial position relationship.

According to another embodiment of the present disclosure, a multiple-device-cooperation electronic system is provided, which comprises a first electronic device and a second electronic device, wherein the first electronic device stores information corresponding to the second electronic device, the second electronic device stores information corresponding to the first electronic device, and both the first electronic device and the second electronic device comprise: a processor configured to detect whether there is a preset electronic device corresponding to the electronic device; if it is, determining a relative spatial position relationship between the electronic device and the electronic device corresponding to the electronic device, and associating the electronic device with the detected electronic device corresponding to the electronic device according to the relative spatial position relationship.

The electronic device association method, the electronic device and the electronic system provided by embodiments of the present disclosure determine the relative spatial position relationship between two electronic devices to establish the association such as resource sharing between them after detecting that the two electronic devices are corresponding to each other, thereby ensuring the electronic devices corresponding to each other can perform interaction by software when satisfying a preset condition, and thus improving the user's experiences.

According to another embodiment of the present disclosure, there is provided a data interaction method for a pad computer, comprising at least two PADs being connected to each other; receiving a trigger signal from its own screen, performing an operation corresponding to the trigger signal, sending the data generated during the operation to other PAD(s) involved in the connection; receiving and storing locally the data sent from other PAD(s) connected to the local PAD.

According to another embodiment of the present disclosure, a data interaction apparatus for a pad computer is provided, comprising: a connection module configured to realize the connection of at least two PADs; a signal receiving module configured to receive a trigger signal from its own screen and receive the data sent from other PAD(s) connected to the local PAD; an operation performing module configured to perform an operation corresponding to the trigger signal; a data sending module configured to send the data generated during the operation to other PAD(s) involved in the connection; a data storing module configured to storing the data sent from other PAD(s) connected to the local PAD.

As seen from the above technical solutions, compared to the prior art, the present disclosure discloses a data interaction method and apparatus for PAD. In the method, the PAD can receive a trigger signal from its own screen, perform an operation corresponding to the trigger signal, and send the data generated during the operation to other PAD(s) involved in the connection; and can also receive and store locally the data sent from other PAD(s) connected to the local PAD. With the data interaction method and apparatus for a pad computer disclosed in the present disclosure, the data interaction of PADs and the data update can be realized anywhere anytime, and the purposes of realizing data interaction without other assisting devices and of simple fast data update are achieved.

It is recognized that both the above general description and the following detailed description are exemplary, and are intended to provide further description of the technologies to be claimed.

DETAILED DESCRIPTION

In the following, the preferable embodiments of the present disclosure will be described in detail with reference to the accompanying figures.

First, the terminal device according to an embodiment of the present disclosure will be described with reference to FIG. 1. For example, the terminal device preferably is a smart phone, a personal digital assistant (PDA), a palmtop computer, or the like.

Figure 1:
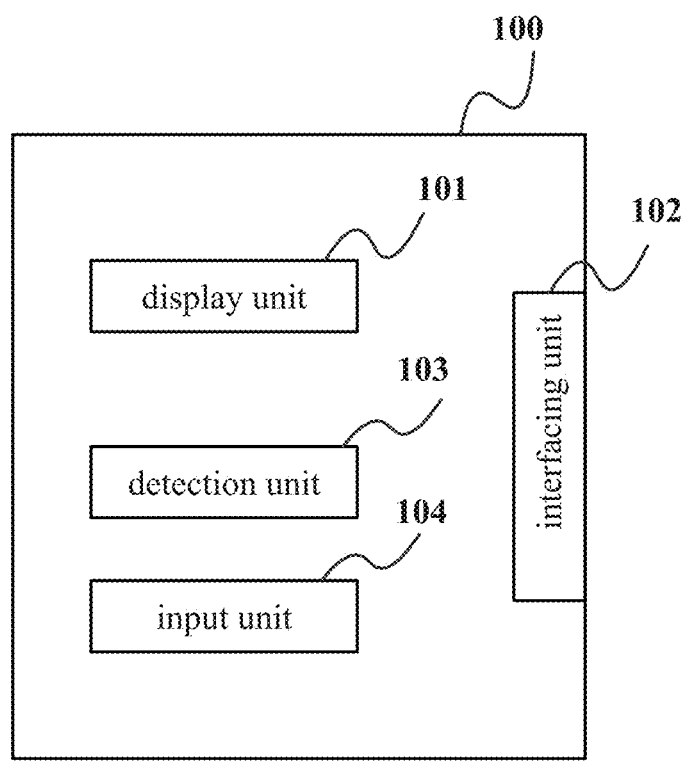
FIG. 1 is a block diagram illustrating a general configuration of a terminal device according to an embodiment of the present disclosure.

As shown in FIG. 1, the first terminal device 100 according to embodiments of the present disclosure has a display unit 101, an interfacing unit 102, a detection unit 103 and an input unit 104. In particular, the display unit 101 is configured to perform the display of a display interface. In the case of using the first terminal device 100 independently, the display unit 101 displays a first display interface, i.e. a local display of the terminal device. Preferably, if the first terminal device 100 is a pad computer, the first display interface is the display interface based on an operating system (such as Window®, Linux®, Android® or the like) of the pad computer. The interfacing unit 102 is configured to perform connection to another terminal device. Preferably, the interfacing unit 102 performs the connection of the first terminal device 100 with another terminal device in a wired manner (for example, via cable or contact physical interface, or the like) or wireless manner (for example, via a network protocol satisfying a standard of IEEE 802.11a, 802.11b, 802.11g or the like, RF (radio frequency) or Bluetooth). The detection unit 103 is configured to detect the connection of the first terminal device 100 with another terminal device and obtain a detection result. The input unit 104 is configured to receive a user input. In particular, if the first terminal device 100 is a pad computer, the display unit 101 and the input unit 104 are integrated into the touch screen of the pad computer.

Next, a display method for a terminal device according to embodiments of the present disclosure will be described with reference to FIG. 2.

The display method for a terminal device according to embodiments of the present disclosure comprises steps S201 to S206.

In step S201, a first display unit of the first terminal device displays a first display interface, in other words, the first display unit of the first terminal device performs a local display of the first terminal device. As described in the above, the first display interface is preferably a display interface of an operating system of the first terminal device.

In step 202, the detection unit of the first terminal detects whether the first terminal device is connected to the second terminal device via the interfacing unit, and obtains a detection result. Preferably, the second terminal device is a same terminal device with the first terminal device, in other words, the second terminal device has a display unit, an interfacing unit, a detection unit and an input unit. However, the present disclosure is not limited to this, and the second terminal device is not limited to this. The second terminal device can be a terminal device such as a smart phone, a PDA, a palmtop computer, etc. In the following, in order to describe the method, assume the second terminal device has a second display unit, and the second display unit displays a second display interface. Similar to the first display interface, the second display interface is preferably the display interface of an operating system of the second terminal device.

If a negative detection result is obtained in step S202, that is, the detection result indicates the first terminal device is not connected to another terminal device (e.g. the second terminal device), the procedure returns to step S201.

If a positive detection result is obtained in step S202, that is, the detection result indicates the first terminal device is connected to the second terminal device, the procedure proceeds to step S203.

In step S203, it is determined that whether the first display unit of the first terminal device remains displaying the first display interface.

If a positive result is obtained in step S203, the procedure proceeds to step S204. In step S204, the first display unit remains displaying the first display interface, and the first terminal device sends a first display signal to the second terminal device, and the second display unit displays the third display interface based on the first display signal.

In particular, in a preferable embodiment of the present disclosure, the third display interface is an extended display interface of the terminal device. In particular, the third display interface is an input control interface of the terminal device. More preferably, the third display interface is a virtual keyboard or a virtual touch plate. When the third display interface is a virtual keyboard, the second terminal device can determine a corresponding character based on the touch position of the user on the virtual keyboard, and send the corresponding character to the first terminal device remaining displaying the first display interface. When the third display interface is a virtual touch plate, the second terminal device can obtain a motion trajectory of the user on the virtual touch plate, convert the motion trajectory into a displacement of the cursor displayed on the first display interface, and send the displacement to the first terminal device remaining displaying the first display interface. Alternatively, the second terminal device can obtain a motion trajectory of the user on the virtual touch plate, convert the motion trajectory into a corresponding command gesture input signal, and send the command gesture input signal to the first terminal device remaining displaying the first display interface.

In this case, the first terminal device makes the first display unit remain the local display (i.e. displaying the first display interface), while the second terminal device switches to perform an extended display of the first terminal device (i.e. displaying the third display interface). As a result, when the two terminal devices are integrated, one of the terminal devices performs the local display of the operating system, and the other of the two terminal devices performs an extended display (such as an extended input control interface), such as to form a complete PC architecture, and make the user's operation much easier.

It is noted that although the first terminal device makes the first display unit remain the display of the first display interface, the first terminal device can adjust the display mode of the first display interface adaptively. In particular, when the first terminal device is used independently, the user operates the first terminal device in a manner of touching, so the first terminal device performs the display in a mode adapted to the manner of touching, for example, displays a large icon. However, when the first terminal device is connected to the second terminal device and the second terminal device displays an extended input control interface, the user operates the first terminal device on the input control interface, so the first terminal device performs the display in a mode adapted to a manner of cursor controlling, for example, displays a small icon.

If a negative result is obtained in step S203, the procedure proceeds to step S205. In step S205, the first display unit displays the third display interface, the first terminal device sends a second display signal to the second terminal device, and the second display unit displays the first display interface based on the second display signal.

In this case, the first terminal device switches to perform an extended display of the first terminal device (i.e. displaying the third display interface), while the second terminal device switches to perform a local display (i.e. displaying the first display interface). Likewise, a complete PC architecture is realized when integrating the two terminal devices.

Now, the procedure of determining whether the first display unit of the first terminal device remains displaying the first display interface performed in step S203 will be described in detail with reference to FIG. 3.

Figure 3:
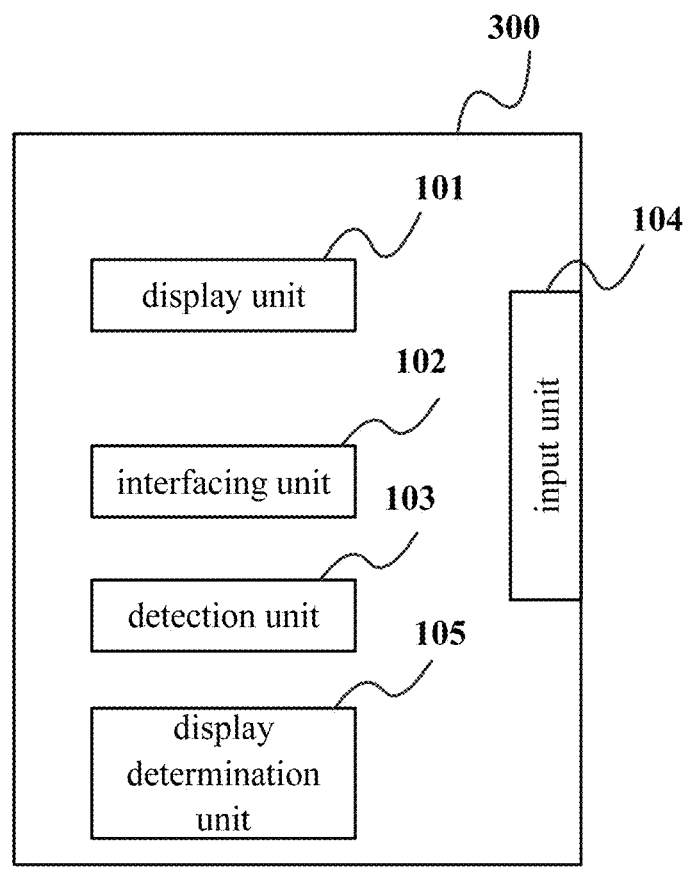
FIG. 3 is a block diagram illustrating a more detailed configuration of a terminal device according to an embodiment of the present disclosure.

FIG. 3 is a block diagram illustrating a more detailed configuration of a terminal device according to an embodiment of the present disclosure. In FIG. 3, the same elements as that in FIG. 1 are assigned the same reference symbols, and their detailed description is omitted. Compared with the first terminal device 100 in FIG. 1, the terminal device 300 shown in FIG. 3 further includes a display determination unit 105. The display determination unit 105 is configured to determine whether the display unit of the terminal device remains displaying the first display interface. In other words, the process of determining whether the display unit of the terminal device remains displaying of the first display interface is a process of determining whether the terminal device is used as the host unit (whose operating system keeps running and which performs various processing) or the input control interface display unit (which only displays a input control interface) of the system formed by the two terminal devices after the terminal device is connected to another terminal device.

In a preferable embodiment of the present disclosure, the display determination unit 105 includes an orientation sensor such as a gyroscope sensor and an accelerator sensor for sensing the orientation of the terminal device relative to the horizontal plane. When connecting the two terminal devices with each other, the orientation sensors in the two terminal devices sense the orientation of the terminal devices relative to the horizontal plane respectively. If the sensing result indicates one of the two terminal devices is parallel to the horizontal plane and the other one is inclined relative to the horizontal plane, the display determination unit 105 determines that the terminal device inclined relative to the horizontal plane performs the local display, that is, displays the display interface based on the operating system of the terminal device, and the display determination unit 105 determines that the other terminal device parallel to the horizontal plane performs an extended display, that is, displays an extended input control interface.

However, the scope of the present disclosure is not limited to this. In another preferable embodiment of the present disclosure, before or after two terminal devices are connected, the user can input an instruction through the input unit 103 to the display determination unit 105 to determine which of the two terminal devices performs the local display and which performs the extended display. Likewise, when the user operates through the PC architecture formed by the two connected terminal device, he can input an instruction through the extended input control interface to the display determination unit 105 to switch the display mode of the two terminal devices. In another preferable embodiment of the present disclosure, the user can pre-set the display determination unit 105 to determine that the terminal device always performs the local display or the extended display when it is connected to another terminal device.

Referring back to FIG. 2, in step S206, the detection unit of first terminal device detects whether the first terminal device is disconnected with the second terminal device.

If a positive result is obtained in step S206, that is, the result indicates the first terminal device is disconnected with the second terminal device, the procedure returns to step S201. The first display unit of the first terminal device returns to display the first display interface, and the second display unit of the second terminal device returns to display the second display interface.

If a negative result is obtained in step S206, that is, the result indicates the first terminal device is connected with the second terminal device, the procedure returns to step S204 or S205 and keeps the corresponding display states.

It is noted that, in the display state of step S204, the first terminal device can receive a first input control signal from the second terminal device, wherein the first input control signal is generated through detecting a trigger by the second terminal device to the third display interface displayed by the second display unit; and the first terminal device makes the first display unit display a fourth display interface different from the first display interface in response to the first input control signal.

Similarly, in the display state of step S205, the first terminal device can detect a trigger to the third display interface displayed by the first display unit to generate a second control signal; and the first terminal device sends the second control signal to the second terminal device, wherein the second terminal device makes the second display unit display a fifth display interface different from the first display interface in response to the second control signal.

In the above, the terminal device according to embodiments of the present disclosure and the display method applied to the terminal device are described with reference to FIGS. 1 to 3. In the following, the multi-terminal system according to embodiments of the present disclosure will be described with reference to FIG. 4.

Figure 4:
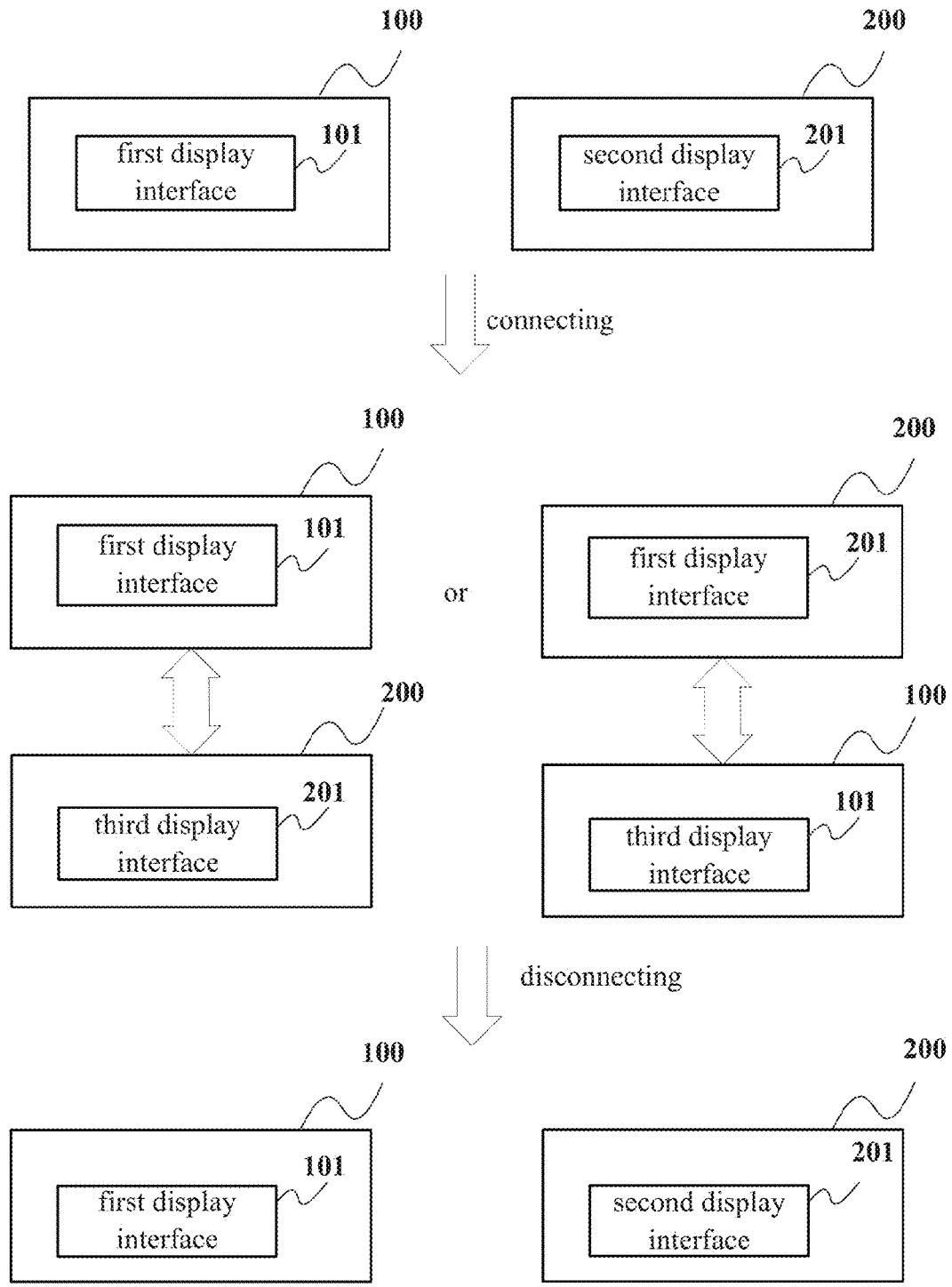
FIG. 4 is schematic diagram illustrating a multi-terminal system according to an embodiment of the present disclosure.

FIG. 4 is a schematic diagram of a multi-terminal system according to embodiments of the present disclosure. For convenience of explanation, FIG. 4 only illustrates two terminal devices (the first terminal device 101 and the second terminal device 102), and in the first terminal device 100 and the second terminal device 200, only the first display unit 101 and the second display unit 201 are illustrated respectively.

As illustrated in FIG. 4, in state (a), the first terminal device 101 and the second terminal device 102 are not connected. The first display interface and the second display interface are displayed respectively on the first display unit 101 and the second display unit 102.

In state (b), the first terminal device 101 and the second terminal device 102 are connected together via the interfacing unit. One of the first display unit 101 and the second display unit 201 displays the first display interface, and the other of the first display unit 101 and the second display unit 201 displays the third display interface which is different from the first display interface.

In particular, when the first terminal device 100 is connected to the second terminal device 200, the first display unit 101 remains displaying the first display interface, the first terminal device 100 sends a first display signal to the second terminal device 200, and the second display unit 201 displays the third display interface based on the first display signal.

Alternatively, when the first terminal device 100 is connected to the second terminal device 200, the first display unit 101 displays the third display interface, the first terminal device 100 sends a second display signal to the second terminal device 200, and the second display unit 201 displays the first display interface based on the second display signal.

Further, in state (c), when the first terminal device 100 is disconnected with the second terminal device 200, the first display unit 101 returns to display the first display interface, and the second display unit 201 returns to display the second display interface.

As shown in FIG. 4, the first terminal device 101 and the second terminal device 102 forms the multi-terminal system according to embodiments of the present disclosure. As a result, when two terminal devices are integrated, one of the two terminal devices performs the local display of the operating system, and the other of the two terminal devices performs the extended display (e.g. an extended input control interface), such as to form a complete PC architecture; while when the two terminal devices are disconnected, the two terminal devices can performs respective local displays as independent devices.

A display method, a terminal device and a system with multiple terminal devices are described with reference to FIGS. 1 to 4 in the above.

It is noted that, in the specification, the term of "comprise", "include" or the like is not meant to be exclusive such that a process, method, article or device comprising a series of elements includes not only those elements but may also include other elements which are not explicitly listed, or may also include inherent elements of such a process, method, article or device. Without more limits, the sentence defining an element by "comprising a" does not exclude the existence of other identical elements in the process, method, article or device comprising the element.

Finally, it is noted that the above series of processes not only include the processes performed in time sequence described herein, but also include the processes performed in parallel or respectively rather than in time sequence.

The information interaction method according to the present disclosure is applied to multiple electronic devices. Information interaction can be performed between the multiple electronic devices, and the multiple electronic devices can be used cooperatively, wherein the multiple electronic devices at least comprise a first electronic device and a second electronic device.

Figure 5:
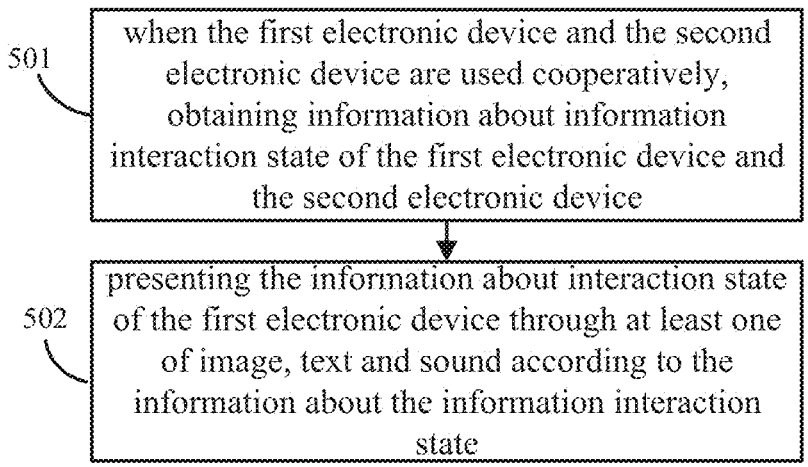
FIG. 5 is a flowchart of embodiment 1 of an information interaction method according to the present disclosure.

FIG. 5 is a flowchart of embodiment 1 of the information interaction method according to the present disclosure. As shown in FIG. 5, the method comprises step 501 and 502.

In 501, when the first electronic device and the second electronic device are used cooperatively, information about information interaction state of the first electronic device and the second electronic device is obtained.

The cooperative use of the first electronic device and the second electronic device can comprise that the first electronic device and the electronic device contact each other, and the second electronic device is used as an input unit of the first electronic device. For example, the first electronic device and the second electronic can be two pad computers. The two pad computers can be used in combination. When the two pad computers are used while they contact each other, one of the devices can be used as an image display unit which is similar to a monitor of a computer, and the other device can be used as information input unit similar to a keyboard of a computer. More specifically, the keyboard can be a virtual keyboard on the touch screen of the pad computer. The information input can be implemented by touch operation on the virtual keyboard of the pad computer. Of course, the two pad computers can also implement data processing functions through their own data processing unit.

The cooperative use of the first electronic device and the second electronic device can further comprise that the first electronic device and the electronic device contact each other, and the first electronic device and the second electronic device run a same application simultaneously wherein the information of the application can be shared between the first electronic device and the second electronic device. For example, the first electronic device and the second electronic device can be two pad computers. The two pad computers can be used in combination. When the two pad devices are used while they contact each other, the screens of the two devices can play video together integrally to increase the area for video displaying.

In 502, the information interaction state of the first electronic device is presented through at least one of image, text and sound according to the information about the information interaction state.

In particular, when the information about the information interaction state represents information interaction time, the information interaction state can be presented in different ways according to the length of the information interaction time. For example, when the information interaction time of two electronic devices reaches a certain degree, a pattern of heart shape can be displayed on the screen of the electronic devices. With further increasing of the information interaction time, the number, shape, color or the like of the heart shapes can change. With further increasing of the information interaction time, the number of the heart shapes could be increased, the shape could be more complicated, and the color can be brighter.

When the information interaction time of two electronic devices reaches a certain degree, a piece of music can also be played by an audio playing unit of the electronic device to inform the user of the information about the information interaction time between multiple electronic devices.

When the information interaction time of two electronic devices reaches a certain degree, the information interaction time can be hinted on the screen of the electronic devices in text form. When the information interaction time is hinted in text form, the time of the information interaction between multiple electronic devices can be directly displayed, or hinted in a manner of "title". For example, when the information interaction time of two electronic devices reaches one day, a title of "accompanying day and night" can be displayed in a predetermined area of the screen; when the information interaction time of the two electronic devices reaches one week, a title of "loving each other" can be displayed in a predetermined area of the screen; when the information interaction time of the two electronic devices reaches one month, a title of "soul mates" can be displayed in a predetermined area of the screen. The example described above is an illustration of hinting the information interaction time in a manner of "title", but the present disclosure is not limited to the above specific titles.

When the information interaction time of two electronic devices reaches a certain degree, it can be hinted through an indicator light (e.g. LED indicator light) of the electronic devices. The number, color or flickering frequency of the indicator lights can change with the information interaction time.

When the information about the information interaction state represents information interaction data amount, the information interaction state can be presented in different ways according to the amount of the information interaction data. For example, when the information interaction data amount of two electronic devices reaches a certain amount, a pattern of heart shape can be displayed on the screen of the electronic devices, or a piece of music can be played by an audio playing unit of the electronic devices, or the information interaction data amount can be hinted on the screen of the electronic devices in text form.

When the information about the information interaction state represents information interaction frequency, the information interaction state can be presented in different ways according to the frequency of the information interaction. For example, when the information interaction frequency of two electronic devices reaches a certain degree, a pattern of heart shape can be displayed on the screen of the electronic devices, or a piece of music can be played by an audio playing unit of the electronic devices, or the information interaction frequency can be hinted on the screen of the electronic devices in a text manner.

In particular, the number for which the first electronic device communicates with the second electronic device within a preset period can be obtained; whether the number of communication is larger than a preset number is determined; when the number of communication is larger than the preset number, the information interaction state is presented in a first manner; when the number of communication is smaller than the preset number, the information interaction state is presented in a second manner. The preset number can be plural, each of which is corresponding to a different level. When the number of communication conforms to a certain level, the preset manner corresponding to the certain level is used for display. For example, if information interaction between two electronic devices occurs frequently, the information interaction frequency can be hinted by increasing the display number of the heart shape pattern, complication degree or brightness of the heart shape pattern, or by playing a piece of music corresponding to a higher preset level through an audio playing unit of the electronic devices, or by a higher present level text form on the screen of the electronic devices. If the information interaction frequency of two certain electronic devices decreases, the information interaction frequency can be hinted by decreasing the display number of the heart shape pattern, complication degree or brightness of the heart shape pattern, or by playing a piece of music corresponding to a lower preset level through an audio playing unit of the electronic devices, or by a lower preset level text form on the screen of the electronic devices.

The presentation of the information interaction state in different manners according to the frequency of the information interaction can inform the user of the frequency of the information interaction of two electronic devices, and can also be used in combination with the display methods of the information interaction time and the information interaction data amount.

To sum up, in the present embodiment, the information interaction state between multiple electronic devices used cooperatively can be presented and the user's experience can be improved by obtaining information about information interaction state of the first electronic device and the second electronic device when the first electronic device and the second electronic device are used cooperatively, and presenting the information interaction state of the first electronic device through at least one of image, text and sound according to the information about the information interaction state.

Figure 6:
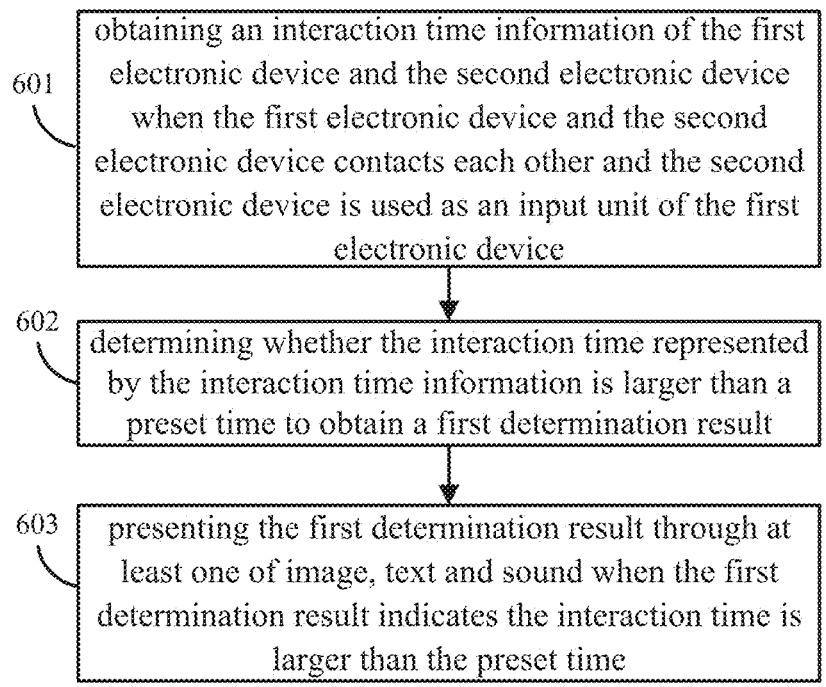
FIG. 6 is a flowchart of embodiment 2 of an information interaction method according to the present disclosure.

FIG. 6 is a flowchart of embodiment 2 of the information interaction method according to the present disclosure. As shown in FIG. 6, the method comprises S601 to S603:

At step 601, an interaction time information of the first electronic device and the second electronic device is obtained when the first electronic device and the second electronic device contacts each other and the second electronic device is used as an input unit of the first electronic device;

At step 602, whether the interaction time represented by the interaction time information is larger than a preset time is determined to obtain a first determination result;

At step 603, the first determination result is presented through at least one manner of image, text and sound when the first determination result indicates the interaction time is larger than the preset time.

Figure 7:
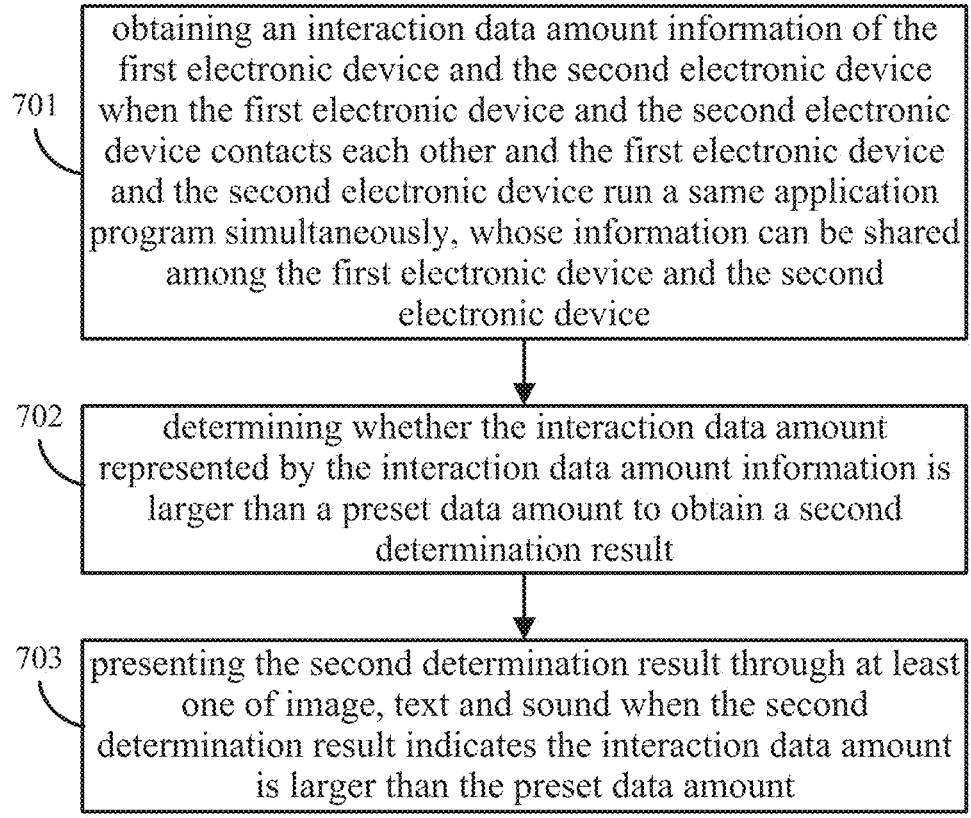
FIG. 7 is a flowchart of embodiment 3 of an information interaction method according to the present disclosure.

FIG. 7 is a flowchart of embodiment 3 of the information interaction method according to the present disclosure. As shown in FIG. 7, the method comprises S701 to S703:

At step 701, an interaction data amount information of the first electronic device and the second electronic device is obtained when the first electronic device and the second electronic device contacts each other and the first electronic device and the second electronic device run a same application program simultaneously, whose information can be shared among the first electronic device and the second electronic device;

At step 702, whether the interaction data amount represented by the interaction data amount information is larger than a preset data amount is determined to obtain a second determination result;

At step 703, the second determination result is presented through at least one manner of image, text and sound when the second determination result indicates the interaction data amount is larger than the preset data amount.

Figure 2:
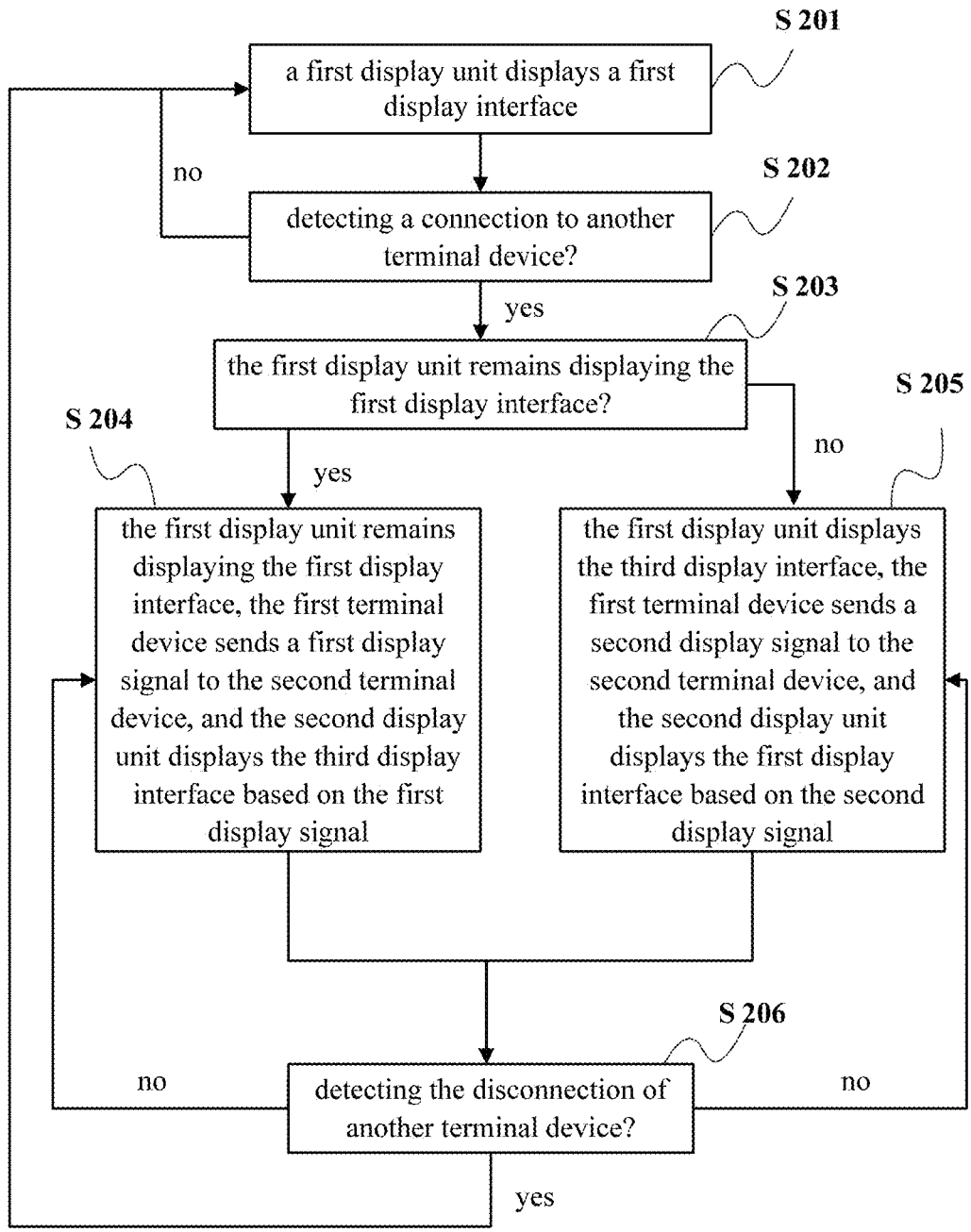
FIG. 2 is a flowchart illustrating a display method according to an embodiment of the present disclosure.

The information interaction methods of the above embodiments of the present disclosure can be used independently or in combination with the display method shown in FIG. 2. The present disclosure also discloses an information interaction system comprising multiple electronic devices, wherein information interaction can be performed between the multiple electronic devices, and the multiple electronic devices can be used cooperatively, and the multiple electronic devices at least comprise a first electronic device and a second electronic device.

Figure 8:
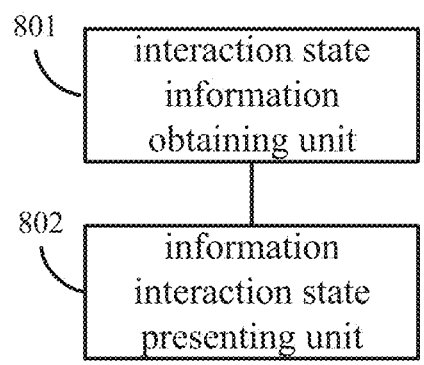
FIG. 8 is a structural diagram of embodiment 1 of an information interaction system according to the present disclosure.

FIG. 8 is a structural diagram of embodiment 1 of the information interaction system according to the present disclosure. As shown in FIG. 8, the information interaction system comprises an interaction state information obtaining unit 801 and an information interaction state presenting unit 802.

The interaction state information obtaining unit 801 is configured to obtain information about information interaction state of the first electronic device and the second electronic device when the first electronic device and the second electronic device are used cooperatively.

The cooperative use of first electronic device and the second electronic device can comprise that the first electronic device and the electronic device contact each other, and the second electronic device is used as an input unit of the first electronic device. For example, the first electronic device and the second electronic can be two pad computers. The two pad computers can be used in combination. When the two pad computers are used while they contact each other, one of the devices can be used as an image display unit which is similar to a monitor of a computer, and the other device can be used as information input unit similar to a keyboard of a computer. More specifically, the keyboard can be a virtual keyboard on the touch screen of the pad computer. The information input can be implemented by touch operation on the virtual keyboard of the pad computer. Of course, the two pad computers can also implement data processing functions through their own data processing unit.

The cooperative use of the first electronic device and the second electronic device can further comprise that the first electronic device and the electronic device contact each other, and the first electronic device and the second electronic device run a same application simultaneously wherein the information of the application can be shared between the first electronic device and the second electronic device. For example, the first electronic device and the second electronic device can be two pad computers. The two pad computers can be used in combination. When the two pad devices are used while they contact each other, the screens of the two devices can play video together integrally to increase the area for video displaying.

The information interaction state presenting unit 802 is configured to present the information interaction state of the first electronic device through at least one manner of image, text and sound according to the information about the information interaction state.

In particular, when the information about the information interaction state represents information interaction time, the information interaction state can be presented in different ways according to the length of the information interaction time. For example, when the information interaction time of two electronic devices reaches a certain degree, a pattern of heart shape can be displayed on the screen of the electronic devices. With further increasing of the information interaction time, the number, shape, color or the like of the heart shapes can change. With further increasing of the information interaction time, the number of the heart shapes can be increased, the shape can be more complicated, and the color can be brighter.

When the information interaction time of two electronic devices reaches a certain degree, a piece of music can also be played by an audio playing unit of the electronic device to inform the user of the information on the information interaction time between multiple electronic devices.

When the information interaction time of two electronic devices reaches a certain degree, the information interaction time can be hinted on the screen of the electronic devices in text form. When the information interaction time is hinted in text form, the time of the information interaction between multiple electronic devices can be directly displayed, or hinted in a manner of "title". For example, when the information interaction time of two electronic devices reaches one day, a title of "accompanying day and night" can be displayed in a predetermined area of the screen; when the information interaction time of the two electronic devices reaches one week, a title of "loving each other" can be displayed in a predetermined area of the screen; when the information interaction time of the two electronic devices reaches one month, a title of "soul mates" can be displayed in a predetermined area of the screen. The example described above is an illustration of hinting the information interaction time in a manner of "title", but the present disclosure is not limited to the above specific titles.

When the information interaction time of two electronic devices reaches a certain degree, it can be hinted through an indicator light (e.g. LED indicator light) of the electronic devices. The number, color or flickering frequency of the indicator lights can change with the information interaction time.

When the information about the information interaction state represents information interaction data amount, the information interaction state can be presented in different ways according to the amount of the information interaction data. For example, when the information interaction data amount of two electronic devices reaches a certain amount, a pattern of heart shape can be displayed on the screen of the electronic devices, or a piece of music can be played by an audio playing unit of the electronic devices, or the information interaction data amount can be hinted on the screen of the electronic devices in text form.

When the information about the information interaction state represents information interaction frequency, the information interaction state can be presented in different ways according to the frequency of the information interaction. For example, when the information interaction frequency of two electronic devices reaches a certain degree, a pattern of heart shape can be displayed on the screen of the electronic devices, or a piece of music can be played by an audio playing unit of the electronic devices, or the information interaction frequency can be hinted on the screen of the electronic devices in text form.

In particular, the number for which the first electronic device communicates with the second electronic device within a preset period can be obtained; whether the number of communication is larger than a preset number is determined; when the number of communication is larger than the preset number, the information interaction state is presented in a first manner; when the number of communication is smaller than the preset number, the information interaction state is presented in a second manner. The preset number can be plural, each of which is corresponding to a different level. When the number of communication stratifies a certain level, the preset manner corresponding to the certain level is used for display. For example, if information interaction between two electronic devices occurs frequently, the information interaction frequency can be hinted by increasing the display number, complication degree or brightness of the heart shape pattern, or by playing a piece of music corresponding to a higher preset level through an audio playing unit of the electronic devices, or by a higher preset level text form on the screen of the electronic devices. If the information interaction frequency of two certain electronic devices decreases, the information interaction frequency can be hinted by decreasing the display number, complication degree or brightness of the heart shape pattern, or by playing a piece of music corresponding to a lower preset level through an audio playing unit of the electronic devices, or by a lower preset level text form on the screen of the electronic devices.

The presentation of the information interaction state in different manners according to the frequency of the information interaction can inform the user of the frequency of the information interaction of two electronic devices, and can also be used in combination with the display methods of the information interaction time and the information interaction data amount.

To sum up, according to the information interaction system of the present embodiment, the information interaction state between multiple electronic devices used cooperatively can be presented and the user's experience can be improved by obtaining information about information interaction state of the first electronic device and the second electronic device when the first electronic device and the second electronic device are used cooperatively, and presenting the information interaction state of the first electronic device through at least one manner of image, text and sound according to the information about the information interaction state.

Figure 9:
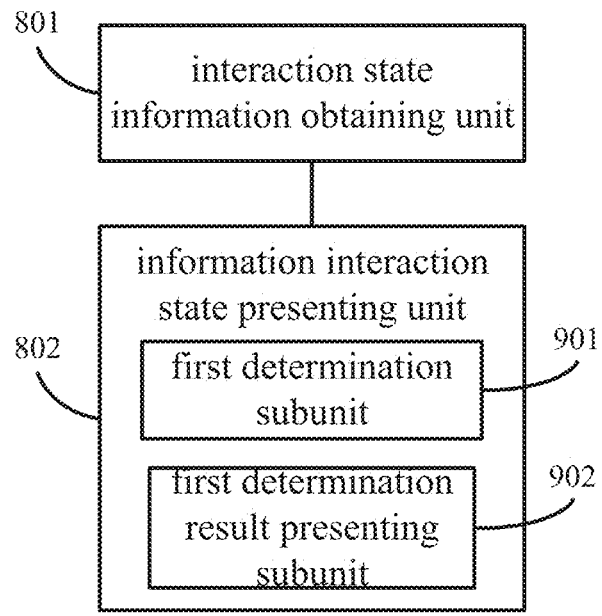
FIG. 9 is a structural diagram of embodiment 2 of an information interaction system according to the present disclosure.

FIG. 9 is a structural diagram of embodiment 2 of the information interaction system according to the present disclosure. As shown in FIG. 9, the information interaction system comprises: an interaction state information obtaining unit 801 configured to obtain information about information interaction state of the first electronic device and the second electronic device when the first electronic device and the second electronic device are used cooperatively; and an information interaction state presenting unit 802 configured to present the information interaction state of the first electronic device through at least one manner of image, text and sound according to the information about the information interaction state.

The information interaction state presenting unit 802 comprises: a first determination subunit 901 configured to determine whether the interaction time represented by the interaction time information is larger than a preset time to obtain a first determination result; and a first determination result presenting subunit 902 configured to present the first determination result through at least one manner of image, text and sound when the first determination result indicates the interaction time is larger than the present time.

Figure 10:
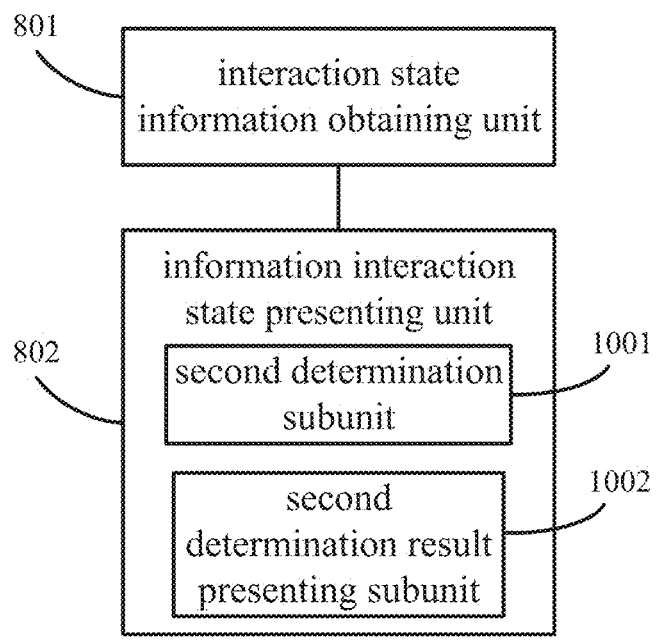
FIG. 10 is a structural diagram of embodiment 3 of an information interaction system according to the present disclosure.

FIG. 10 is a structural diagram of embodiment 3 of the information interaction system according to the present disclosure. As shown in FIG. 10, the information interaction system comprises: an interaction state information obtaining unit 801 configured to obtain information about information interaction state of the first electronic device and the second electronic device when the first electronic device and the second electronic device are used cooperatively; and an information interaction state presenting unit 802 configured to present the information interaction state of the first electronic device through at least one manner of image, text and sound according to the information about the information interaction state.

The information interaction state presenting unit 802 comprises: a second determination subunit 1001 configured to determining whether the interaction data amount represented by the interaction data amount information is larger than preset data amount to obtain a second determination result; and a second determination result presenting subunit 1002 configured to present the second determination result through at least one of image, text and sound when the second determination result indicates the interaction data amount is larger than the present data amount.

The information interaction systems of the above embodiments according to the present disclosure can be used independently or in combination with the multi-terminal system shown in FIG. 4.

Figure 11:
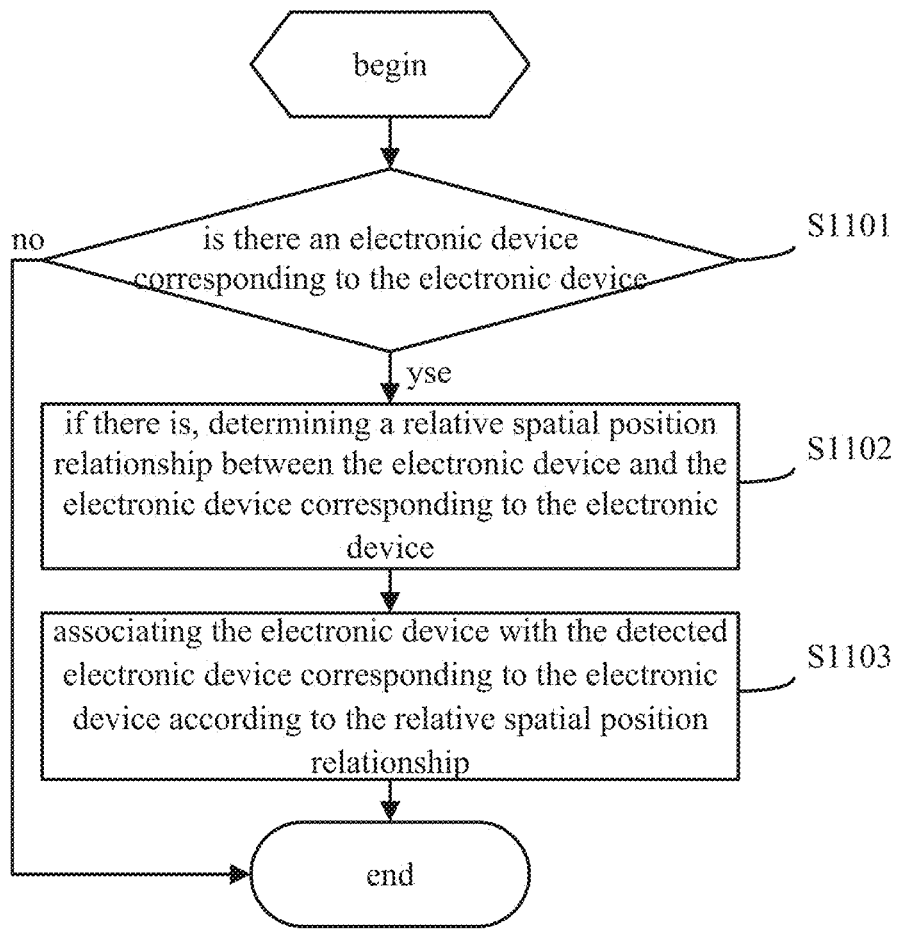
FIG. 11 is a flowchart of an electronic device association method disclosed by an embodiment of the present disclosure.

In addition, embodiments of the present disclosure also disclose an electronic device association method applied to electronic devices between which correspondence is preset. For example, if two Pads are preset to be couple devices, a correspondence is established between them. As shown in FIG. 11, the method comprises steps S1101, S1102 and S1103.

In S1101, whether there is a preset electronic device corresponding to the electronic device is detected.

The executor of the detection is any electronic device that has set the correspondence. An electronic device corresponding to the electronic device refers to a preset electronic device which can be connected to the electronic device in hardware or software, such as a couple Pad. In hardware, their frames can fit each other completely, and in software, they can share resources wirelessly among others.

The specific detection method can comprise: obtaining identification data pre-stored in the electronic device, wherein the identification data is information uniquely identifying the electronic device, which can for example be Identity (ID) number of the electronic device; identifying whether there is an electronic device corresponding to the identification data within a preset range, and if so, confirming detection of the electronic device corresponding to the electronic device.

The detection range can be set previously. For example, the detection range can be set as a range of a 1 meter radius with the electronic device as the center. The electronic devices outside the range cannot be detected.

In S1102, if there is a preset electronic device corresponding to the electronic device, a relative spatial position relationship between the electronic device and the electronic device corresponding to the electronic device is determined.

The relative spatial position relationship refers to a position relationship such as the distance between two electronic devices, the angle formed by two electronic devices, etc.

In the present embodiment, the relative spatial position relationship can preferably include but not limited to the following three types of relative spatial position relationship: the spacing between the two electronic devices being lower than a preset distance value; the two electronic devices being docked to each other with a docking angle of 180 degree; and the two electronic devices being docked to each other with a docking angle of 120 degree.

The spacing between the two electronic devices refers to a spatial distance, i.e. a distance defined by three-dimension spatial coordinates. For example, the spatial distance between them is smaller than 1 meter. In this case, only the distance between the two electronic devices is considered without considering their angle, holding orientation or the like. The two electronic devices being docked to each other refers to the frames of the two electronic devices engaging with each other so as to make the two electronic devices form an integral body. For example, preferably in the present embodiment, the two electronic devices corresponding to each other has the same size, and the frames on the top of their screens are both narrow frames. The screens of the two electronic devices are both put to face the user, and the narrow frames are put to contact each other completely, that is, the two electronic devices are docked to each other. At this point, the two electronic devices can be considered as an integral body. In practical applications, it can be set that the two electronic devices are considered to be docked to each other when the spacing between the frames of the two electronic devices is smaller than 5 millimeters. The docking angle refers to the angle formed by the two electronic devices after they are docked to each other. The two electronic devices can be in the same plane, wherein the angle formed by them is 180 degree. They can also be in different planes, for example, an angle of 120 degree is formed between the two electronic devices.

Figure 12:
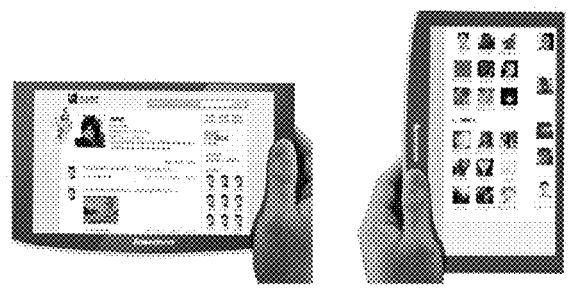
FIG. 12 is a schematic diagram of a relative spatial position relationship of electronic devices disclosed by an embodiment of the present disclosure.
Figure 12:
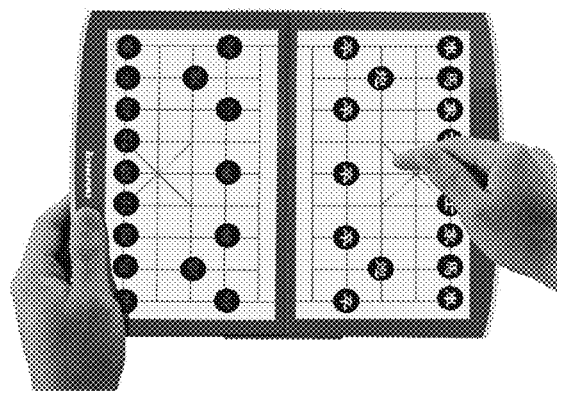
Figure 12:

FIG. 12 shows electronic devices in the above three kinds of relative spatial position relationship, wherein the first electronic devices 1201 and the second electronic devices 1202 are electronic devices corresponding to each other. In (a), the first electronic device 1201 and the second electronic device 1202 are close to each other, and their spacing is smaller than a preset distance value. The first electronic device 1201 is held horizontally and the second electronic device 1202 is held vertically. In (b), the first electronic device 1201 and the second electronic device 1202 are docked to each other with a docking angle of 180 degree. In (c), the first electronic device 1201 and the second electronic device 1202 are docked to each other with a docking angle of 120 degree.

In S1103, the electronic device is associated with the detected electronic device corresponding to the electronic device according to the relative spatial position relationship.

Here, associating two electronic devices refers to establishing connection in software between the electronic devices. The connection manner can employ a wireless communication manner.

It is noted that the manner of associating two electronic devices is determined according to the relative spatial position relationship of the two electronic devices. The correspondence between the relative spatial position relationship and the association manners can be preset in order to determine which association manner would be chosen according to the relative spatial space relationship. As described in the above, the present embodiment selects three types of relative spatial position relationship. Accordingly, the manners for associating the two electronic devices can also include three types.

When the spacing between the electronic device and the electronic device corresponding thereto is smaller than the preset distance value, the electronic device and the electronic device corresponding thereto are made to share the resources and/or the operating state.

As shown in FIG. 12 (a), when the spacing between the electronic device and the electronic device corresponding thereto is smaller than the preset distance value, no matter how are the angle formed by the first electronic device and the second device and their holding orientations, the resources and/or the operating states within them are shared, that is, multimedia files such as music, picture, video, etc., application programs, and so on are shared. In particular, all or part of the hard disks of them can be shared wirelessly. At the same time, it is also possible to display the operating state of one electronic device in another electronic device. For example, when the user is writing a work report using the first electronic device, the operating state of the first electronic device displayed on the second electronic device is "a Word file is running the title of file is work report". Alternatively, when the user is watching a video by using the second electronic device, the first electronic device would display the video playing software running in the second electronic device and the title of the video.

When the electronic device and the electronic device corresponding thereto are docked to each other with a docking angle of 180 degree, the electronic device and the electronic device corresponding thereto are controlled to run a same program.

The general concept of this association manner is to integrate two electronic devices into one electronic device for use. That is, two small touch display screens are joined together to be a big touch display screen. At the same time, the two control and processing systems performs unified control and processing as a whole. As shown in FIG. 12(b), when the electronic device and the electronic device corresponding thereto are docked to each other with a docking angle of 180 degree, the display screens of the first electronic device and the second electronic devices are used as a whole. For example, if the first electronic device is running a chess application program when being docked, then the second device being docked together is made to run this application program. In particular, the two display screen works as a whole to display the interface of the chess application program in combination. For good display, it is allowed for one of the two screens with the same size to display half of the content of the chess board, and the other to display the other half of the content of the chess board. At the same time, the input systems and the control systems of the two electronic devices are also associated, and the users can control the movement of the chessmen through the touch display screens of the first electronic device and the second electronic device respectively.

Alternatively, if the second electronic device is playing a video when being docked, the first electronic device is also controlled to play this video. In particular, the playing area is extended to the screen of the first electronic device to make the two small screens play as one large screen. At the same time, it is possible to perform operations such as pause, full-screen, etc. on the playing through the touch display screens in both the first electronic device and the second electronic device.

This association manner can associate various programs. For example, the program can be desktop, wherein the first electronic device displays shortcuts and the second electronic device displays menus, and the operations can be performed by clicking the shortcuts and the menus respectively. As another example, the program can be a music player, wherein the first electronic device displays a song list, the second electronic device displays the song playing or lyrics, and it is possible to choose a song by clicking the song list.

For this association manner, the followings should be noted. First, if neither the first electronic device nor the second electronic device runs an application program when being docked, they both keep the state of not running an application program. In particular, the first electronic device and the second electronic device display one desktop together, and work as one electronic device. Second, if the first electronic device and the second electronic device run different application programs when being docked, one of the application programs can be chosen to be closed and the other application program keeps running in association according to the user's setting. The user's setting can be performed in advance, or the options can be prompted for the user to select when the docking is succeeded. Third, when two electronic devices run the same application program in association, the control system of any one of the electronic devices can be used, and the control system of the other electronic device can be turned off while only the display unit and the input unit of the other electronic device keep working. It is also possible to use the control systems of the two electronic devices simultaneously to control respective display, input, output, etc., respectively, and perform communication wirelessly to maintain the synchronization of the controls.

When the electronic device and the electronic device corresponding thereto are docked to each other with a docking angle of 120 degree, one of the electronic device and the electronic device corresponding thereto is configured as an input unit, and the other is configured as a display unit corresponding to the input unit.

As shown in FIG. 12(c), when the first electronic device and the second electronic device are docked to each other with a docking angle of 120 degree, the first electronic device is configured to be an input unit, and the second electronic device is configured to be an output unit corresponding to the first electronic device. In this case, the first electronic device and the second electronic device constitute a device similar to a notebook computer, the first electronic device is equivalent to an input keyboard, and the second electronic device is equivalent to a monitor. When a program is running, the first electronic device is responsible for the input, and the second electronic device is responsible for displaying output. For example, when a game is running, the second electronic device displays the game interface, the touch display screen of the first electronic device displays virtual input keys for the game, and the user plays the game through the keys. As another example, when an application program such as text input is running, the second electronic device displays the interface after the text input while the first electronic device displays a virtual keyboard, and the text input can be realized by clicking the virtual keyboard. Alternatively, the second electronic device displays a desktop while the first electronic device displays virtual keys and a mouse sensing area, and it is possible to perform corresponding operations by clicking the virtual keys or moving in the mouse sensing area.

It is noted that two corresponding electronic devices are described as examples in the present embodiment; however, the number of corresponding electronic devices are not limited to two, but can also be three. Any two of them can implement the association described in the present embodiment, and unnecessary details are omitted here.

According to the electronic device association method disclosed in the present embodiment, the relationship in software of the corresponding electronic devices is established by detecting the relative spatial position relationship between the corresponding electronic devices, such as to enrich the interaction between the corresponding electronic devices and realize real "couple" electronic devices. Therefore, the user's experience improves dramatically.

The electronic device association method in the above embodiments of the present disclosure can be used independently or in combination with the display method shown in FIG. 2.

Figure 13:
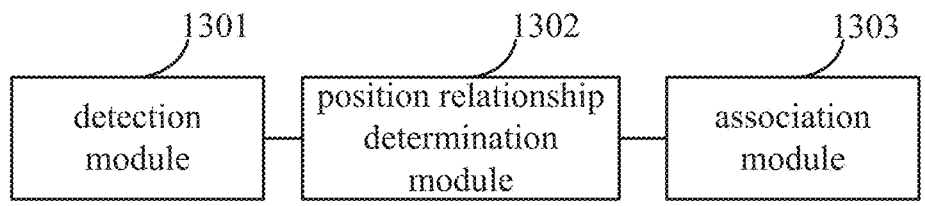
FIG. 13 is a schematic structural diagram of an electronic device disclosed by an embodiment of the present disclosure.

Corresponding to the above method, the present disclosure also discloses an electronic device, as shown in FIG. 13, comprising a detection module 1301, a position relationship determination module 1302 and an association module 1303.

The detection module 1301 is configured to detect whether there is a preset electronic device corresponding to the electronic device.

The electronic device can store identification information of the electronic device corresponding thereto previously. When the distance of the electronic device and the electronic device corresponding thereto is smaller than a preset distance value, the detection module can detect it.

Figure 14:
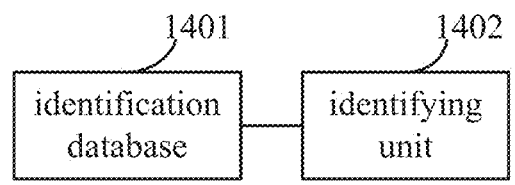
FIG. 14 is a schematic structural diagram of a detection module in an electronic device disclosed by an embodiment of the present disclosure.

Further, as shown in FIG. 14, the detection module comprises: an identification database 1401 configured to store preset identification data of the electronic device corresponding to the electronic device; an identifying unit 1402 configured to identify whether there is an electronic device corresponding to the identification data in the identification database within a preset range, and if so, confirm detection of the electronic device corresponding to the electronic device.

The position relationship determination module 1302 is configured to determine a relative spatial position relationship between the electronic device and the electronic device corresponding to the electronic device if there is an electronic device corresponding to the electronic device.

Figure 15:
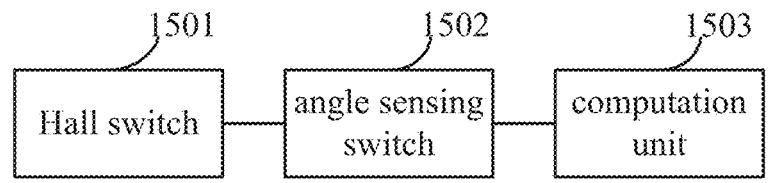
FIG. 15 is a schematic structural diagram of a position relationship determination module in an electronic device disclosed by an embodiment of the present disclosure.

Further, as shown in FIG. 15, the position relationship determination module comprises a Hall switch 1501, an angle sensing switch 1502 and a computation unit 1503.

The Hall switch is a switch sensing distance according to Hall effect, and in the present embodiment, is configured to sense the distance between the electronic device and the detected terminal device corresponding thereto. The angle sensing switch is configured to sense the angle formed between the electronic device and the detected electronic device corresponding thereto. The computation unit is configured to compute the relative spatial position relationship between the electronic device and the detected electronic device corresponding thereto according to the distance sensed by the Hall switch and the angle sensed by the angle sensing switch.

The association module 1303 is configured to associate the electronic device with the detected electronic device corresponding to the electronic device according to the relative spatial position relationship.

Further, in the present embodiment, according to different relative spatial positions, the association module comprises one or any combination of a sharing unit, an associated-operating unit and a function configuration unit. The sharing unit is configured to make the electronic device and the electronic device corresponding thereto share the resources and/or the operating states when the position relationship determination module determines that the spacing between the electronic device and the electronic device corresponding thereto is smaller than the preset distance value.

The associated-operating unit configured to control the electronic device and the electronic device corresponding thereto to run the same program when the electronic device and the electronic device corresponding thereto are docked to each other with a docking angle of 180 degree.

The function configuration unit is configured to configure one of the electronic device and the electronic device detected corresponding thereto as an input unit, and the other as a display unit corresponding to the input unit when the electronic device and the electronic device corresponding thereto are docked to each other with a docking angle of 120 degree.

When a combination of several of the above sharing unit, associated-operating unit and function configuration unit is included, various units can be put in the same processing chip, or in different processing chips. The present embodiment has no limitation on that.

According to the electronic device in the present embodiment, two corresponding electronic devices can be associated with each other in software level by the relative spatial position relationship between the two corresponding electronic devices, such as to improve the user's use experience.

The electronic device in the above embodiments of the present disclosure can be used independently or in combination with the terminal device shown in FIGS. 1 and 3.

The present disclosure also discloses a multiple-device-cooperation electronic system, comprising a first electronic device and a second electronic device, wherein the first electronic device stores therein information corresponding to the second electronic device, the second electronic device stores therein information corresponding to the first electronic device, and both the first electronic device and the second electronic device comprise:

a processor configured to detect whether there is a preset electronic device corresponding to the electronic device; if it is, determine a relative spatial position relationship between the electronic device and the electronic device corresponding to the electronic device; and associate the electronic device with the detected electronic device corresponding to the electronic device according to the relative spatial position relationship.

In the multiple-device-cooperation electronic system according to the present embodiment, the first electronic device and the second device are electronic devices corresponding to each other, and can realize mutual association in software level. A specific procedure is as follows.

If the first electronic device (or the second electronic device) detects the second electronic device (or the first electronic device) within a preset range, the two electronic devices are associated with each other by determining the relative spatial position information between them. For example, when the spacing between the electronic device and the electronic device corresponding thereto is smaller than the preset distance value, the electronic device and the electronic device corresponding thereto are made to share the resources and/or the operating states within them; when the electronic device and the electronic device corresponding thereto are docked to each other with a docking angle of 180 degree, the electronic device and the electronic device corresponding thereto are controlled to run the same program; when the electronic device and the electronic device corresponding thereto are docked to each other with a docking angle of 120 degree, one of the electronic device and the electronic device corresponding thereto is configured as an input unit, and the other is configured as a display unit corresponding to the input unit.

When the first electronic device is associated with the second electronic device, it is possible to control the running of the two electronic devices by using the processor of the first electronic device, and it is also possible to control the running of the electronic devices respectively by their respective processors, but in this case, the synchronization of the operation of the first electronic device and the second electronic device should be maintained by wireless communication.

The multi-device-cooperation electronic system described in the present embodiment realizes real multi-device cooperation in term of software, and improves the user's use experience dramatically.

The multi-device-cooperation electronic system of the above embodiments of the present disclosure can be used independently or in combination with the multi-terminal system shown in FIG. 4.

Figure 16:
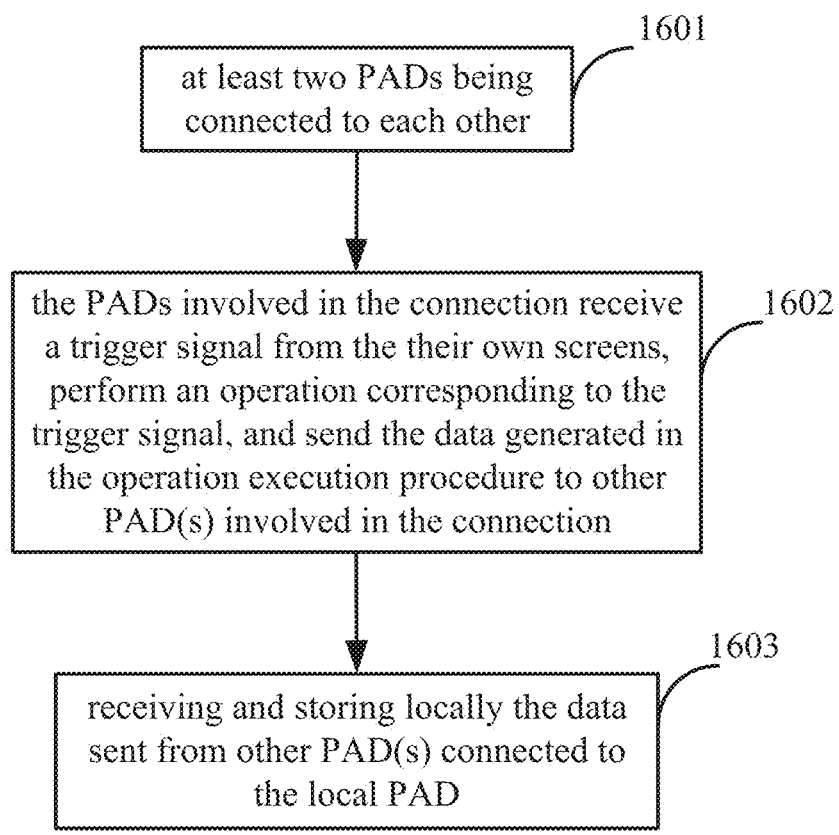
FIG. 16 is a flowchart of a data interaction method for PAD disclosed by an embodiment of the present disclosure.

FIG. 16 is a flowchart of a data interaction method for PAD disclosed by an embodiment of the present disclosure. As shown in FIG. 16, the method can comprise step 1601, step 1602 and step 1603.

In step 1601, at least two PADs are connected to each other.

Figure 17:
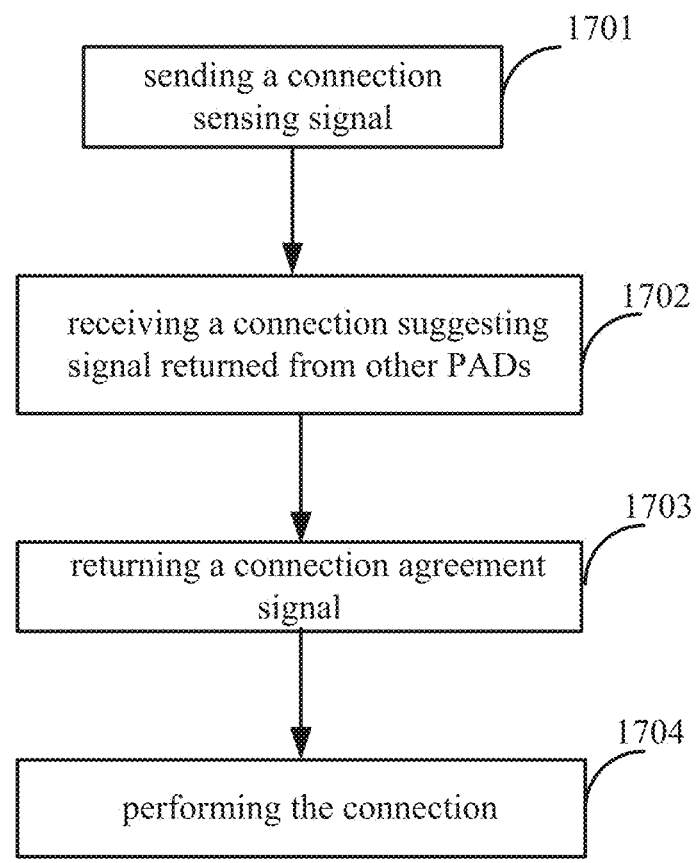
FIG. 17 is a flowchart of a connection method for PAD disclosed by an embodiment of the present disclosure.

In the following, the procedure of connection will be described in the view of one PAD. With reference to FIG. 17, the connection procedure can comprise step 1701, step 1702, step 1703 and step 1704.

In step 1701, a connection sensing signal is sent.

Each PAD can send a connection sensing signal. The connection sensing signal can be received and recognized by other PADs within a certain range. The recognition range is related to the type and the transmission mechanism of the connection sensing signal, and can change with the development of the technology. Preferably, the connection sensing signal can be a short distance wireless communication identifying signal.

In step 1702, a connection suggestion signal returned from other PADs is received.

After a PAD receives a connection suggestion signal sent by other PADs, it can perform matching recognition to the signal. If the connection sensing signal is recognized being match with the present device, the connection suggestion signal can be sent to the PAD sending the connection sensing signal. The base for the matching recognition can be a unique recognition signal provided in the PAD manufactured by a certain company, or can be a signal which can be recognized generally by pad computers with similar functions.

In step 1703, a connection agreement signal is returned.

After the PAD sending the connection recognition signal receives the connection suggestion signal sent by other PADs, its screen would display a notice for choosing whether to connect. Connecting or not connecting can be chosen according to the user's need.

In step 1704, the connection is performed.

If the PAD sending the connection recognition signal chooses to connect with the PAD sending the connection suggestion signal, the two or more PADs can be connected by internal configuration.

It is noted that any PAD when sending a connection sensing signal can also receive the connection sensing signal sent from other PADs, perform matching-recognition on the received connection sensing signal, and return a connection suggestion signal. In other words, among the PADs involved in the connection, any PAD performs the same function and procedure as others, and the PADs are maters and slaves to each other.

After step 1601, the procedure proceeds to step 1602.

In step 1602, the PADs involved in the connection receive a trigger signal from the their own screens, perform an operation corresponding to the trigger signal, and send the data generated in the operation performing procedure to other PAD(s) involved in the connection.

After each PAD is connected, their operations do not disturb each other. They can be input devices for others, and perform a certain operation on their own screen. Each PAD can send the data generated in the operation executing procedure to other PADs involved in the connection in real time to enable any PAD involved in the connection to realize fastest data update and sharing. The data generated in the operation executing procedure can be sent to other PADs involved in the connection through WI-FI technology or Bluetooth technology. The data can be operation instructions directly, and thus after the data sent by other PADs connected to the local PAD is received, a step of the local PAD performing corresponding operations based on the received operation instructions can also include.

In step 1603, the data sent from other PAD(s) connected to the local PAD is received and stored locally.

Any PAD involved in the connection can possibly receive data sent from other PADs involved in the connection to obtain the latest shared data. The PAD would also store the received data locally. As such, even if the connected PAD is disconnected, it can independently access the data involved during the connection.

In other embodiments, after at least two PADs are connected, a step of joining the screens of the PADs involved in the connection into one big screen to display data can also be included, such as to enable the user to watch the data being operated conveniently and facilitate the user's operation. Joining the PADs involved in the connection into one big screen to display data can be implemented through wireless sensing technology, or implemented by other technologies that can join multiple screens for display. Preferably, the PAD can comprise an apparatus that can fixedly connect PADs thereon, in order to make the PADs have a uniform and harmonic appearance after the screens are jointed together and enable the user to hold the PADs by one hand. For example, if four PADs are used cooperatively for drawing a picture, several users can perform drawing operations or modification operations on the four PADs respectively after the four PADs are connected. The PADs involved in the connection can operate alternately, or it is also possible that any one of the PADs operates for several steps and then operates together with other PADs. The new data generated in the drawing or modification procedure can be sent to other PADs involved in the connection in real time. As such, even if the connected PADs are disconnected, each PAD still stores complete final picture data.

In the PAD data interaction method of the present embodiment, the PAD can receive a trigger signal from its own screen, perform an operation corresponding to the trigger signal, and send the data generated in the operation execution procedure to other PAD(s) involved in the connection; at the same time the PAD can receive and store locally the data sent from other PAD(s) connected to the local PAD. With the data interaction method for pad computer PADs disclosed by the present disclosure, it is possible to realize data interaction between PADs and implement update anytime anywhere, and thus achieve the purpose of implementing easy and fast data interaction and data update without other assistant devices.

The PAD data interaction method in the above embodiments of the present disclosure can be used independently or in combination with the display method shown in FIG. 2.

The method has been described in the above embodiment of the present disclosure in detail. The method according to the present disclosure can be realized through various apparatuses; therefore, the present disclosure also discloses an apparatus whose particular embodiment is described in the following.

Figure 18:
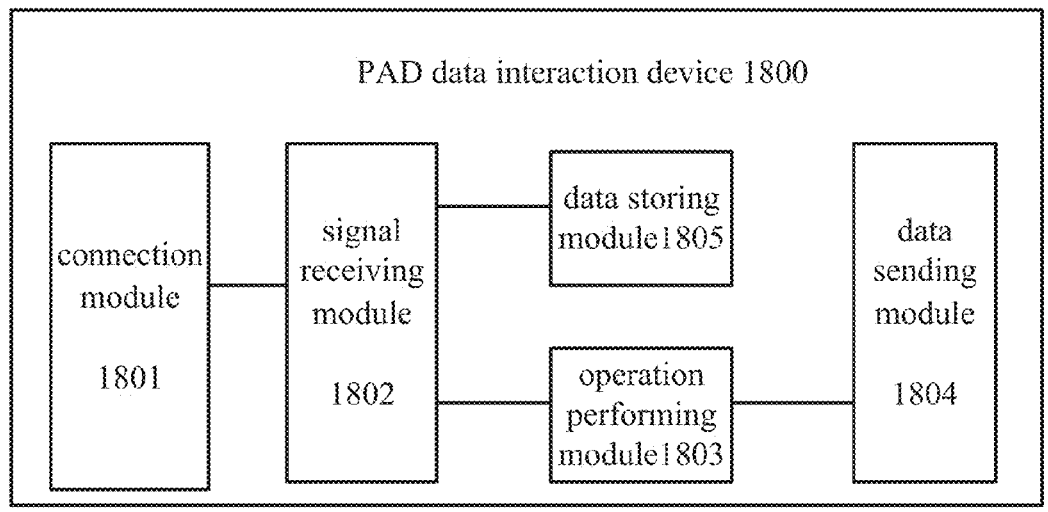
FIG. 18 is a schematic structural diagram of a data interaction apparatus for PAD disclosed by an embodiment of the present disclosure.

FIG. 18 is a schematic structural diagram of a data interaction apparatus for PAD (PAD data interaction apparatus) disclosed by an embodiment of the present disclosure. As shown in FIG. 18, the PAD data interaction apparatus 1800 can comprise:

a connection module 1801 configured to realize the connection of at least two PADs; a signal receiving module 1802 configured to receive a trigger signal from the screen of the computer itself and receive the data sent from other PAD(s) connected to the local PAD; an operation performing module 1803 configured to perform an operation corresponding to the trigger signal; a data sending module 1804 configured to send the data generated in the operation execution procedure to other PAD(s) involved in the connection, wherein if the data generated in procedure of the operation performing module 1803 performing operations is an operation instruction, the apparatus can also comprise an instruction executing module configured to perform a corresponding operation according to the received operation instruction; and a data storing module 1805 configured to storing the data sent from other PAD(s) connected to the local PAD.

Figure 19:
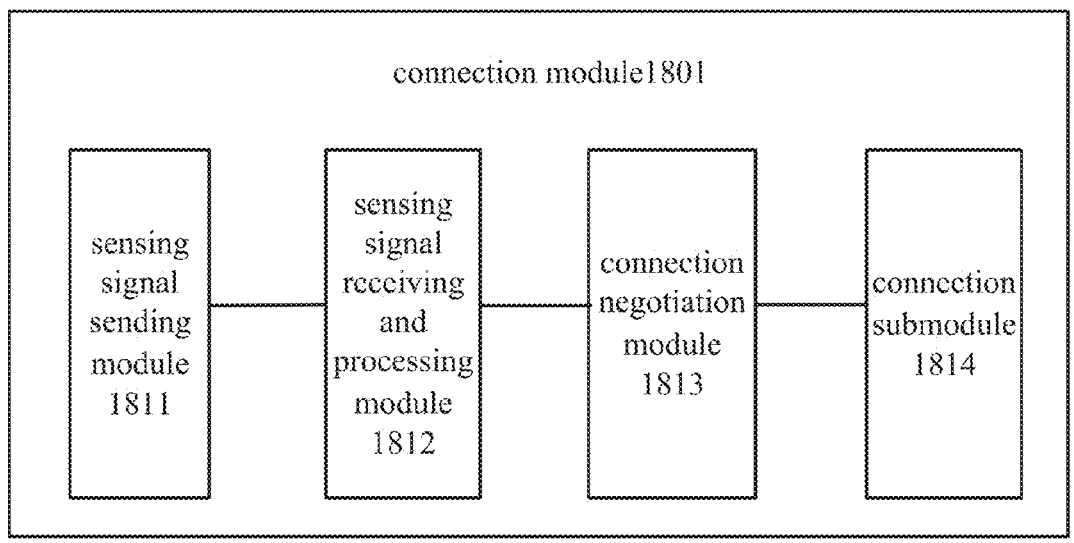
FIG. 19 is a schematic structural diagram of a connection module disclosed by an embodiment of the present disclosure.

The specific structure of the connection module 1801 can refer to FIG. 19. As shown in FIG. 19, the connection module can comprise:

a sensing signal sending module 1811 configured to send a connection sensing signal; a sensing signal receiving and processing module 1812 configured to receive a connection sensing signal sent from other PAD(s), match the received connection sensing signal with the local PAD itself, and return a connection suggestion signal if the matching is correct; a connection negotiation module 1813 configured to receive a connection suggestion signal returned from other PAD(s), and send a connection agreement signal to the PAD(s) returning the connection suggestion signal; a connection submodule 1814 configured to connect with the PAD(s) returning the connection agreement signal.

In other embodiments, it can also comprise a screen-combining module which can be configured to combine the screens of the PADs involved in the connection into one big screen for displaying data in order to facilitate the user to watch and/or operate data.

In the PAD data interaction apparatus of the present embodiment, the PAD can receive a trigger signal from its own screen, perform an operation corresponding to the trigger signal, and send the data generated in the operation execution procedure to other PAD(s) involved in the connection; at the same time the PAD can receive and store locally the data sent from other PAD(s) connected to the local PAD. With the data interaction method for pad computer PADs disclosed by the present disclosure, it is possible to realize data interaction between PADs and implement update anytime anywhere, and thus achieve the purpose of implementing easy and fast data interaction and data update without other assistant devices.

An embodiment of the present disclosure also discloses a pad computer which comprises a PAD data interaction apparatus disclosed in the present disclosure. With the pad computer, it is possible to realize data interaction between PADs and implement update anytime anywhere, and thus achieve the purpose of implementing easy and fast data interaction and data update without other assistant devices.

The pad computer in the above embodiment of the present disclosure can be used independently or in combination with the terminal devices shown in FIGS. 1 and 3.

Finally, it is noted that, in the specification, the relative terms such as "first" and "second" are only used to distinguish one entity or operation from another entity or operation, but do not necessarily require or imply there is any such real relation or order between those entities or operations. In addition, the term of "comprise", "include" or the like is not meant to be exclusive such that a process, method, article or device comprising a series of elements includes not only those elements but may also include other elements which are not explicitly listed, or may also include inherent elements of such a process, method, article or device. Without more limits, the sentence defining an element by "comprising a" does not exclude the existence of other identical elements in the process, method, article or device comprising the element.

With the description of the above embodiments, those skilled in the art can clearly realize that the present disclosure can be realized by software in combination with necessary hardware platforms, or entirely by hardware. Based on such understanding, all or part of the contributions of the solutions of the present disclosure to the prior art can be embodied in the form of software product. The computer software product can be stored in a storage medium such as ROM/RAM, magnetic disk, optical disk, etc., and include instructions for causing a computer device (which can be a personal computer, a server, or a network device) to implement the methods described in each embodiment.

The present disclosure has been described in detail in the above. In the specification, specific examples are employed to explain the principle and embodiments of the present disclosure, and the description of the above embodiments are only to facilitate understanding the methods and core concepts of the present disclosure. In addition, those skilled in the art would make alternations to the specific embodiments and the application ranges according to the concepts. In conclusion, the content of the specification should not be considered as limiting of the present disclosure.

What is claimed is:

1. A display method applied to a first terminal device comprising a first display unit, the method comprising:
   displaying a first display interface by the first display unit;
   detecting a connection to a second terminal device and obtaining a detection result, wherein the second terminal device comprises a second display unit displaying a second display interface;
   when the detection result indicates the first terminal device is connected to the second terminal device, one of the first display unit and the second display unit displays the first display interface, while the other of the first display unit and the second display unit displays a third display interface,
   wherein the third display interface is different from the first display interface,
   when the detection result indicates the first terminal device is connected to the second terminal device, the first display unit remains displaying the first display interface, the first terminal device sends a first display signal to the second terminal device, and the second display unit displays the third display interface based on the first display signal, and when the first display unit remains displaying the first display interface, the first terminal device sends a first display signal to the second terminal device, and the second display unit displays the third display interface based on the first display signal, the method further comprises: receiving a first input control signal from the second terminal device, wherein the first input control signal is generated by the second terminal device detecting a trigger to the third display interface displayed by the second display unit; and making the first display unit display a fourth display interface different from the first display interface in response to the first input control signal; or
   the first display unit displays the third display interface, the first terminal device sends a second display signal to the second terminal device, and the second display unit displays the first display interface based on the second display signal; and when the first display unit displays the third display interface, the first terminal device sends a second display signal to the second terminal device, and the second display unit displays the first display interface based on the second display signal, the method further comprises: generating a second control signal by detecting a trigger to the third display interface displayed by the first display unit; and sending the second control signal to the second terminal device, wherein the second terminal device makes the second display unit display a fifth display interface different from the first display interface in response to the second control signal.

2. The display method according to claim 1, wherein the third interface is an input control interface, and the input control interface is configured to receive user input in order to control the first display unit and the second first display unit.

3. A display method applied to a first terminal device comprising a first display unit, the method comprising:
   displaying a first display interface by the first display unit;
   detecting a connection to a second terminal device and obtaining a detection result, wherein the second terminal device comprising a second display unit displaying a second display interface;
   when the detection result indicates the first terminal device is connected to the second terminal devices, one of the first display unit and the second display unit displaying the first display interface, while the other of the first display unit and the second display unit displaying a third display interface,
   wherein the third display interface is different from the first display interface,
   the first terminal device and the second terminal device can perform information interaction with each other and can be used cooperatively, and the method further comprises:
   when the first terminal device and the second terminal devices are used cooperatively, obtaining information about information interaction state of the first terminal device and the second terminal device; and
   presenting the information interaction state of the first terminal device through at least one of image, text and sound according to the information about the information interaction state.

4. The display method according to claim 3, wherein the information about the information interaction state comprises interaction time information, and presenting the information interaction state of the first terminal device through at least one of image, text and sound according to the information about the information interaction state comprises:
   determining whether the interaction time represented by the interaction time information is larger than a preset time to obtain a first determination result,
   when the first determination result indicates the interaction time is larger than the present time, displaying the first determination result through at least one of image, text and sound; or
   determining whether the interaction data amount represented by the interaction data amount information is larger than preset data amount to obtain a second determination result,
   when the second determination result indicates the interaction data amount is larger than the present data amount, displaying the second determination result through at least one of image, text and sound.

5. A display method applied to a first terminal device comprising a first display unit, the method comprising:
   displaying a first display interface by the first display unit;
   detecting a connection to a second terminal device and obtaining a detection result, wherein the second terminal device comprising a second display unit displaying a second display interface;
   when the detection result indicates the first terminal device is connected to the second terminal devices, one of the first display unit and the second display unit displaying the first display interface, while the other of the first display unit and the second display unit displaying a third display interface,
   wherein the third display interface is different from the first display interface; and
   detecting a connection to a second terminal device and obtaining a detection result comprises:
   detecting whether there is a preset second terminal device corresponding to the first terminal device;
   if there is the preset second terminal device corresponding to the first terminal device, determining a relative spatial position relationship between the first terminal device and the second terminal device;
   associating the first terminal device with the second terminal device corresponding thereto according to the relative spatial position relationship.

6. The display method according to claim 5, wherein determining the relative spatial position relationship comprises:

obtaining identification data prestored in the first terminal device;

identifying whether there is the second terminal device corresponding to the identification data within a preset range, and if it is, confirming detection of the second terminal device corresponding to the first terminal device.

7. The display method according to claim 5, wherein associating the first terminal device with the second terminal device corresponding thereto according to the relative spatial position relationship comprises:

when the spacing between the first terminal device and the second terminal device corresponding thereto is smaller than a preset distance value, making the first terminal device and the second terminal device corresponding thereto share resources and/or operating states.

8. The display method according to claim 5, wherein associating the first terminal device with the second terminal device corresponding thereto according to the relative spatial position relationship comprises:

when the first terminal device and the second terminal device corresponding thereto are docked to each other with a docking angle of 180 degree, controlling the first terminal device and the second terminal device to run a same program.

9. A display method applied to a first terminal device comprising a first display unit, the method comprising:

displaying a first display interface by the first display unit;

detecting a connection to a second terminal device and obtaining a detection result, wherein the second terminal device comprising a second display unit displaying a second display interface;

when the detection result indicates the first terminal device is connected to the second terminal devices, one of the first display unit and the second display unit displaying the first display interface, while the other of the first display unit and the second display unit displaying a third display interface, wherein the third display interface is different from the first display interface; and when the detection result indicates the first terminal device is connected to the second terminal, the method further comprises:

receiving a trigger signal from the screen of the first terminal device, performing an operation corresponding to the trigger signal, and sending data generated in the performing procedure to the second terminal device;

receiving and storing locally the data sent from the second terminal device, wherein the first terminal device and the second terminal device are pad computers.

10. A terminal device, comprising:

a first display unit configured to display a first display interface; and a detection unit configured to detect a connection of the terminal device to another terminal device and obtain a detection result, wherein the another terminal device comprises a second display unit displaying a second display interface, wherein when the detection result indicates the terminal device is connected to the another terminal devices, one of the first display unit and the second display unit displays the first display interface, while the other of the first display unit and the second display unit displays a third display interface, and wherein the third display interface is different from the first display interface, when the detection result indicates the terminal device is connected to the another terminal devices, the first display unit remains displaying the first display interface, the terminal device sends a first display signal to the another terminal device, and the second display unit displays the third display interface based on the first display signal, and when the first display unit remains displaying the first display interface, the terminal device sends a first display signal to the another terminal device, and the second display unit displays the third display interface based on the first display signal, the terminal device receives a first input control signal from the another terminal device, wherein the first input control signal is generated by the another terminal device detecting a trigger to the third display interface displayed by the second display unit; and the terminal device makes the first display unit display a fourth display interface different from the first display interface in response to the first input control signal; or the first display unit displays the third display interface, the terminal device sends a second display signal to the another terminal device, and the second display unit displays the first display interface based on the second display signal, and when the first display unit displays the third display interface, the terminal device sends a second display signal to the another terminal device, and the second display unit displays the first display interface based on the second display signal, the terminal device generates a second control signal by detecting a trigger to the third display interface displayed by the first display unit; and the terminal device sends the second control signal to the another terminal device, wherein the another terminal device makes the second display unit display a fifth display interface different from the first display interface in response to the second control signal.

11. The terminal device according to claim 10, wherein when the detection result indicates the terminal device is disconnected to the another terminal devices, the first display unit displays the first display interface, and the second display unit displays the second display interface.

12. A terminal device, comprising:

a first display unit configured to display a first display interface; and a detection unit configured to detect a connection of the terminal device to another terminal device and obtain a detection result, wherein the another terminal device comprising a second display unit displaying a second display interface, wherein when the detection result indicates the terminal device is connected to the another terminal devices, one of the first display unit and the second display unit displays the first display interface, while the other of the first display unit and the second display unit displays a third display interface, the third display interface is different from the first display interface; and the detection unit comprises:

a detection module configured to detect whether there is another terminal device preset corresponding to the terminal device;

a position relationship determination module configured to determine a relative spatial position relationship between the terminal device and the detected another terminal device corresponding to the terminal device if there is another terminal device preset corresponding to the terminal device;

an association module configured to associate the terminal device with the detected another terminal device corresponding thereto according to the relative spatial position relationship.

13. The terminal device according to claim 12, wherein the detection module comprises:
an identification database configured to store preset identification data of the another terminal device corresponding to the terminal device;
an identifying unit configured to identify whether there is another terminal device corresponding to the identification data in the identification database within a preset range, and if it is, confirm detection of the another terminal device corresponding to the terminal device.

14. The terminal device according to claim 12, wherein the position determination module comprises:
a Hall switch configured to sense the distance between the terminal device and the detected another terminal device corresponding thereto;
an angle sensing switch configured to sense the angle formed between the terminal device and the detected another terminal device corresponding thereto;
a computation unit configured to compute the relative spatial position relationship between the terminal device and the detected another terminal device corresponding thereto according to the distance sensed by the Hall switch and the angle sensed by the angle sensing switch.

15. A terminal device, comprising:
a first display unit configured to display a first display interface; and
a detection unit configured to detect a connection of the terminal device to another terminal device and obtain a detection result, wherein the another terminal device comprising a second display unit displaying a second display interface,
wherein when the detection result indicates the terminal device is connected to the another terminal devices, one of the first display unit and the second display unit displays the first display interface, while the other of the first display unit and the second display unit displays a third display interface,
the third display interface is different from the first display interface; and
terminal device further comprises:
a connection module configured to realize connection to at least the another terminal device;
a signal receiving module configured to receive a trigger signal from the screen of the terminal device and receive data sent from the another terminal device connected to the terminal device when the detection result indicates that the terminal device is connected to the another terminal device;
an operation performing module configured to perform an operation corresponding to the trigger signal;
a data sending module configured to send the data generated in the operation performing procedure to the another terminal device;
a data storing module configured to store the data sent from the another terminal device connected to the terminal device,
wherein the terminal device and the another terminal device are pad computers.

16. A system with multiple terminal devices, at least comprising:
a first terminal device comprising a first display unit displaying a first display interface; and
a second terminal device comprising a second display unit displaying a second display interface;
wherein the first terminal device detects a connection to the second terminal device and obtains a detection result, when the detection result indicates the first terminal device is connected to the second terminal devices, one of the first display unit and the second display unit displaying the first display interface, while the other of the first display unit and the second display unit displaying a third display interface,
wherein the third display interface is different from the first display interface;
the first terminal device and the second terminal device can perform information interaction with each other and can be used cooperatively, and the system further comprises:
an interaction state information obtaining unit configured to obtain information about information interaction state of the first terminal device and the second terminal device when the first terminal device and the second terminal devices are used cooperatively; and
an information interaction state presenting unit configured to present the information interaction state of the first terminal device through at least one of image, text and sound according to the information about the information interaction state.

17. The multi-terminal device system according to claim 16, wherein cooperative use of the first terminal device and the second terminal device comprises that the first terminal device and the terminal device contact each other, and the second terminal device is used as an input unit of the first terminal device.

* * * * *